United States Patent
Akiyama et al.

(10) Patent No.: US 12,267,804 B2
(45) Date of Patent: Apr. 1, 2025

(54) PORTABLE INFORMATION TERMINAL, INFORMATION PROCESSING SYSTEM, AND METHOD FOR IDENTIFYING AREA WHERE PORTABLE INFORMATION TERMINAL IS PRESENT

(71) Applicant: Maxell, Ltd., Kyoto (JP)

(72) Inventors: Hitoshi Akiyama, Kyoto (JP); Tamotsu Ito, Kyoto (JP)

(73) Assignee: MAXELL, LTD., Kyoto (JP)

( * ) Notice: Subject to any disclaimer, the term of this patent is extended or adjusted under 35 U.S.C. 154(b) by 140 days.

(21) Appl. No.: 17/788,380

(22) PCT Filed: Dec. 25, 2019

(86) PCT No.: PCT/JP2019/050925
§ 371 (c)(1),
(2) Date: Jun. 23, 2022

(87) PCT Pub. No.: WO2021/130925
PCT Pub. Date: Jul. 1, 2021

(65) Prior Publication Data
US 2023/0044852 A1  Feb. 9, 2023

(51) Int. Cl.
*H04W 64/00* (2009.01)
*G06F 3/14* (2006.01)
(Continued)

(52) U.S. Cl.
CPC ............ *H04W 64/003* (2013.01); *G06F 3/14* (2013.01); *G06T 7/50* (2017.01); *G06T 7/70* (2017.01); *H04W 12/06* (2013.01); *H04W 84/12* (2013.01)

(58) Field of Classification Search
CPC ... H04W 64/003; H04W 84/12; H04W 12/06; G06T 7/50; G06T 7/70; G06F 3/14
See application file for complete search history.

(56) References Cited

U.S. PATENT DOCUMENTS

| 2005/0059416 A1 | 3/2005 | Ono |
| 2009/0033588 A1 | 2/2009 | Kajita et al. |

(Continued)

FOREIGN PATENT DOCUMENTS

| JP | 2002-112287 A | 4/2002 |
| JP | 2004-240708 A | 8/2004 |

(Continued)

OTHER PUBLICATIONS

International Search Report and Written Opinion mailed on Mar. 24, 2020, received for PCT Application PCT/JP2019/050925, filed on Dec. 5, 2019, 13 pages including English Translation.

(Continued)

*Primary Examiner* — Michelle Chin
(74) *Attorney, Agent, or Firm* — XSENSUS LLP

(57) ABSTRACT

An information processing system comprising a portable information device, a relay apparatus that connects the portable information device to a network, and a server. The server includes a library in which, for each relay apparatus, an area where the relay apparatus is present is registered in association with relay apparatus identification information. The portable information device obtains connection authentication from the relay apparatus installed in an area where the own device is present, and when the authentication is successful, the relay apparatus that provides the authentication transmits the relay apparatus identification information to the server.

11 Claims, 17 Drawing Sheets

(51) Int. Cl.
    *G06T 7/50*     (2017.01)
    *G06T 7/70*     (2017.01)
    *H04W 12/06*     (2021.01)
    *H04W 84/12*     (2009.01)

(56) References Cited

U.S. PATENT DOCUMENTS

| | | | |
|---|---|---|---|
| 2011/0314208 A1* | 12/2011 | Feinberg | H04L 63/0853 710/33 |
| 2013/0247117 A1* | 9/2013 | Yamada | H04B 5/72 340/12.5 |
| 2016/0007162 A1 | 1/2016 | Sugaya | |
| 2020/0366805 A1* | 11/2020 | Aoki | H04N 1/00244 |

FOREIGN PATENT DOCUMENTS

| | | | |
|---|---|---|---|
| JP | 2005-86770 A | 3/2005 | |
| JP | 2016-14988 A | 1/2016 | |
| JP | 2016-126456 A | 7/2016 | |

OTHER PUBLICATIONS

Extended European Search Report issued Jan. 8, 2024, in corresponding European Patent Application No. 19957961.6, 13 pages.

* cited by examiner

FIG. 4A
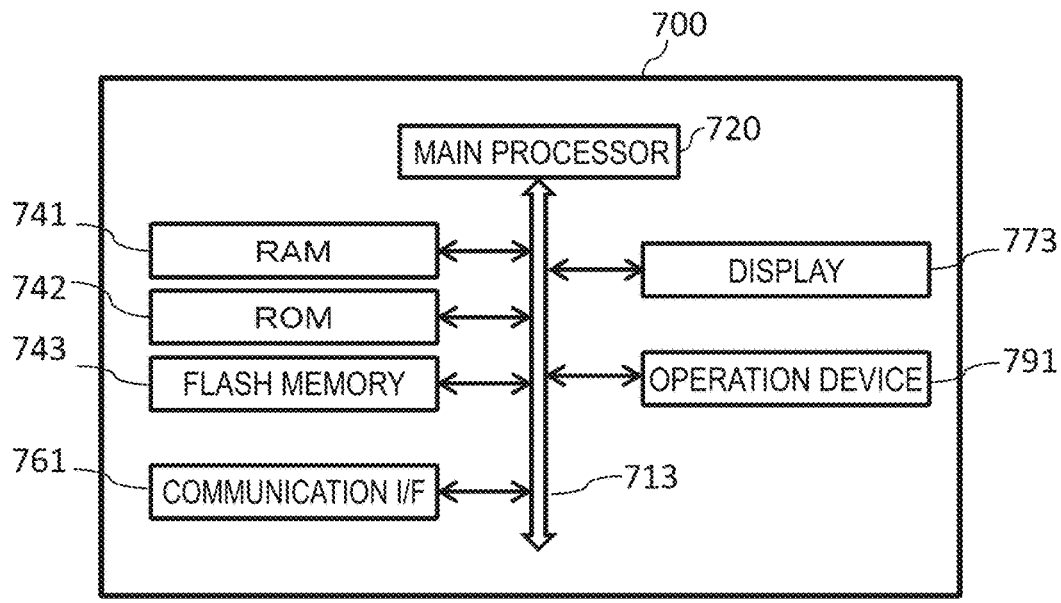
FIG. 4B
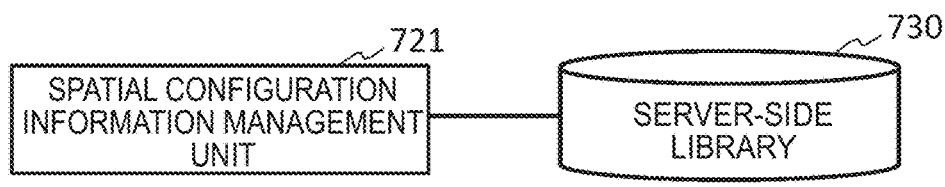
FIG. 4C
| ROOM NUMBER | ROOM 511 | ROOM 512 | --- | ROOM n |
|---|---|---|---|---|
| AP-ID (MAC ADDRESS) | Adrs01 | Adrs02 | --- | Adrs0n |
| SPATIAL CONFIGURATION INFORMATION | Map01 | Map02 | --- | Map0n |
| AR IMAGE INFORMATION | AR01 | AR02 | --- | AR0n |
| SOUND INFORMATION | Snd01 | Snd02 | --- | Snd0n |
| OTHER INFORMATION | Othr01 | Othr02 | --- | Othr0n |

| ROOM | ROOM 511 | ROOM 512 | | ROOM n |
|---|---|---|---|---|
| BS-ID | BSID01 | BSID02 | --- | BSID0n |
| SPATIAL CONFIGURATION INFORMATION | Map01 | Map02 | --- | Map0n |
| AR IMAGE INFORMATION | | | | |
| | | | | |
| | | | | |

221d — BS-ID row
221b — SPATIAL CONFIGURATION INFORMATION row
221c — AR IMAGE INFORMATION row

| ROOM NUMBER | ROOM 511 | ROOM 512 | | ROOM n |
|---|---|---|---|---|
| BS-ID | BSID01 | BSID02 | --- | BSID0n |
| SPATIAL CONFIGURATION INFORMATION | Map01 | Map02 | --- | Map0n |
| AR IMAGE INFORMATION | AR01 | AR02 | --- | AR0n |
| SOUND INFORMATION | Snd01 | Snd02 | --- | Snd0n |
| OTHER INFORMATION | Othr01 | Othr02 | --- | Othr0n |

731 — ROOM NUMBER row
732b — BS-ID row
733 — SPATIAL CONFIGURATION INFORMATION row
735 — AR IMAGE INFORMATION row

| | AP331 | AP332 |
|---|---|---|
| CONNECTION PW | AAPP31 | AAPP32 |
| PERFORMANCE | MEDIUM SPEED CONNECTION DATA VOLUME LIMITED WITH ADVERTISEMENTS | HIGH SPEED CONNECTION DATA VOLUME NOT LIMITED NO ADVERTISEMENTS |

FIG.11

| | | | | 730 |
|---|---|---|---|---|
| 731 ROOM NUMBER | ROOM 511 | | | |
| 732 AP-ID (MAC ADDRESS) | Adrs331 | Adrs332 | --- | |
| 733 SPATIAL CONFIGURATION INFORMATION | Map31 | Map32 | --- | |
| 734 RESOLUTION | XX | YY | | |
| 735 AR IMAGE INFORMATION | AR31 | AR32 | --- | |
| 736 RESOLUTION | XXX | YYY | | |
| SOUND INFORMATION | Snd01 | Snd02 | --- | |
| OTHER INFORMATION | Othr01 | Othr02 | --- | |

| ROOM | ROOM 511 | ROOM 512 | | ROOM n |
|---|---|---|---|---|
| AP-ID | AP001 | AP002 | --- | AP00n |
| SPATIAL CONFIGURATION INFORMATION | Map01 | Map02 | --- | Map0n |
| RESOLUTION | XXX | XXX | | |
| AR IMAGE INFORMATION | | | | |
| | | | | |

221a — AP-ID row
221b — SPATIAL CONFIGURATION INFORMATION row
221e — RESOLUTION row
221c — AR IMAGE INFORMATION row

| ROOM NUMBER | ROOM 1 | ROOM 2 | | ROOM n |
|---|---|---|---|---|
| AP-ID | Adrs01 | Adrs02 | --- | Adrs0n |
| SPATIAL CONFIGURATION INFORMATION | Map01 | Map02 | --- | Map0n |
| RESOLUTION | XXX | YYY | | |
| AR IMAGE INFORMATION | AR01 | AR02 | --- | AR0n |
| RESOLUTION | XXX | YYY | | |
| SOUND INFORMATION | Snd01 | Snd02 | --- | Snd0n |
| OTHER INFORMATION | Othr01 | Othr02 | --- | Othr0n |

731 — ROOM NUMBER
732 — AP-ID
733 — SPATIAL CONFIGURATION INFORMATION
734 — RESOLUTION
735 — AR IMAGE INFORMATION
736 — RESOLUTION

| ROOM NUMBER | ROOM 1 | ROOM 2 | | ROOM n |
|---|---|---|---|---|
| AP-ID | Adrs01 | Adrs02 | --- | Adrs0n |
| SPATIAL CONFIGURATION INFORMATION | Map01 | Map02 | --- | Map0n |
| AR IMAGE INFORMATION | AR01 | AR02 | --- | AR0n |
| LOCATION INFORMATION | X1,y1 | X2,y2 | | Xn,yn |
| SOUND INFORMATION | Snd01 | Snd02 | --- | Snd0n |
| OTHER INFORMATION | Othr01 | Othr02 | --- | Othr0n |

PORTABLE INFORMATION TERMINAL, INFORMATION PROCESSING SYSTEM, AND METHOD FOR IDENTIFYING AREA WHERE PORTABLE INFORMATION TERMINAL IS PRESENT

CROSS-REFERENCE TO RELATED APPLICATION

The present application is based on PCT filing PCT/JP2019/050925, filed Dec. 25, 2019, the entire contents of which are incorporated herein by reference.

TECHNICAL FIELD

The present invention relates to a technique for identifying an area where a portable information device such as a head mounted display (hereinafter, referred to as an "HMD") is present.

BACKGROUND ART

An HMD is configured to display a video, in which an augmented reality (AR) image (AR image of an avatar or the like) generated by a computer is superimposed on an image of a real space, on a display screen in the form of spectacles. The AR images are generally stored in external servers. In order for an HMD to accurately extract information about an area where the HMD is currently present from among a large number of AR images stored in the external servers, or in order for the external servers to properly provide each HMD with information, it is necessary to identify the area where the HMD is present.

As a technique for identifying an area where an HMD is present, for example, Patent Literature 1 discloses "an experience facility comprises a plurality of section areas. A detection antenna D receives an identification code generated by a head mount display device (HMD) to detect in which section area the HMD exists among the section areas, and in which direction the HMD faces. A storage means stores image information different from each section area and an extract means extracts the image information in response to the detected direction in the image information in the corresponding section area. The HMD displays the extracted virtual image (excerpted from Abstract)".

CITATION LIST

Patent Literature

Patent Literature 1: JP-A-2002-112287

SUMMARY OF INVENTION

Technical Problem

In the technique disclosed in Patent Literature 1, a total of sixteen reception antennas receives an identification signal transmitted from the HMD, whereby an area where the HMD is present is identified based on the relative topology of each of the reception antennas. Furthermore, a total of four transmission antennas installed in advance transmits position codes which are different to each other, respectively, and then the HMD identifies an area where it is present based on the relative topology of the received four position codes. Thus, in order to identify an area where an HMD is present, it is necessary to install a new facility such as a plurality of antennas, and this requires a huge cost.

The present invention has been made in view of the circumstances described above, and an object of the present invention is to provide a technique enabling identification of an area where a portable information device having a communication function, such as an HMD, is present with necessary and sufficient accuracy without requiring a special facility (hardware).

Solution to Problem

In order to solve the problems described above, the present invention provides an information processing system, comprising: a portable information device; relay apparatuses each of which connects the portable information device to a network; and a server, the server including a library in which an area where each of the relay apparatuses is present is registered, for each of the relay apparatuses, in association with relay apparatus identification information identifying each of the relay apparatuses, the portable information device being configured to obtain connection authentication from corresponding one of the relay apparatuses which is installed in an area where an own device is present, and when the connection authentication is successful, the corresponding one of the relay apparatuses that has provided the connection authentication being configured to transmit the relay apparatus identification information to the server.

Advantageous Effects of Invention

It is possible to identify an area where an HMD is present with necessary and sufficient accuracy without requiring a special facility (hardware). The objects, configurations, and advantageous effects other than those described above will be clarified by explanation of the embodiments below.

BRIEF DESCRIPTION OF DRAWINGS

FIG. 4(a) is a hardware configuration diagram of a server according to the first embodiment, FIG. 4(b) is a functional block diagram of a server according to the first embodiment, and FIG. 4(c) illustrates a server-side library according to the first embodiment.

FIG. 8(a) illustrates an HMD-side library according to the first modification, and FIG. 8(b) illustrates a server-side library according to the first modification.

FIG. 11 illustrates a server-side library according to the second embodiment.

FIG. 12(*a*) illustrates an HMD-side library according to the third embodiment, and FIG. 12(*b*) illustrates a server-side library according to the third embodiment.

DESCRIPTION OF EMBODIMENTS

Hereinafter, embodiments of the present invention will be described with reference to the drawings. Throughout the drawings, the same features are provided with the same reference signs, and repetitive explanation therefor will be omitted.

First Embodiment

Figure 1A:
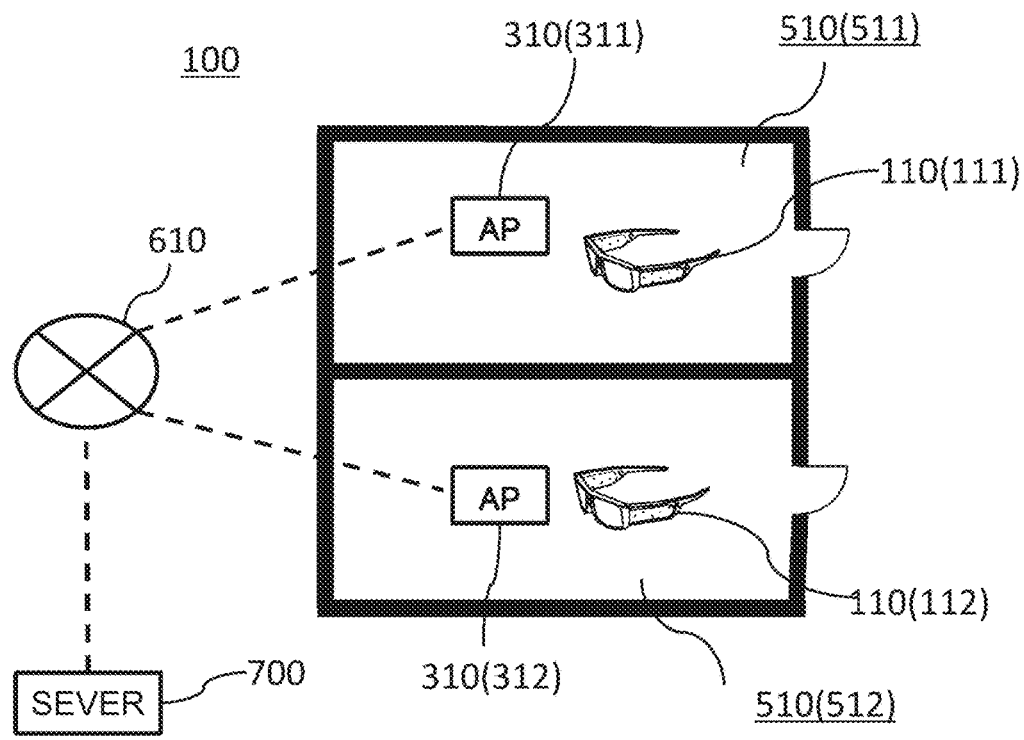
FIG. 1(a) illustrates an outline of a presence area identification system according to the first embodiment.
Figure 1B:
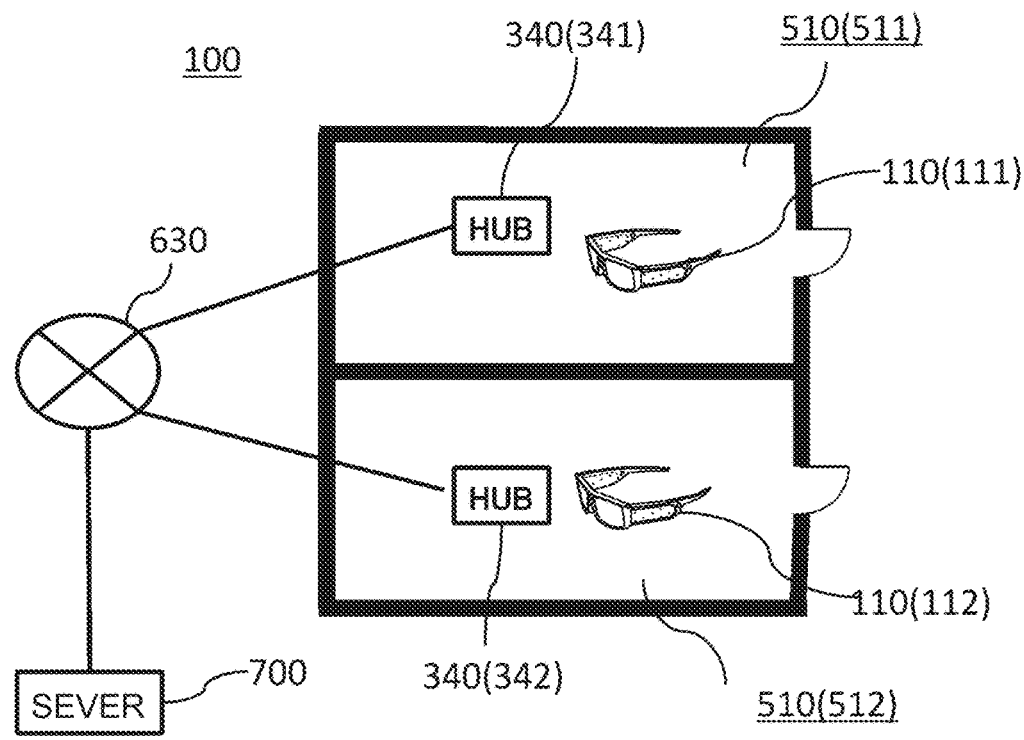
FIG. 1(b) illustrates an outline of a presence area identification system according to the third modification.

Firstly, an outline of the present embodiment will be described. FIG. 1(*a*) illustrates an outline and operating environment of a presence area identification system 100 according to the present embodiment.

As illustrated in FIG. 1(*a*), the presence area identification area 100 of the present embodiment includes an HMD 110, an access point 310 installed in each room 510, and a server 700. The presence area identification area 100 of the present embodiment is a wireless local area network (LAN) system in which the HMD 110 and the server 700 transmit and receive data wirelessly therebetween through the access point 310. Hereinafter, in the detailed description of the present invention, a space delimited by structures is referred to as a room.

In the present embodiment, each room 510 (511, 512) is provided with an access point (AP) 310 (311, 312) for wireless LAN connection. The server 700, which manages various data necessary for AR display, identifies the room 510 based on the identification information on the access point 310.

In the present embodiment, when a user (HMD wearer) wearing the head mounted display (HMD) 110 enters the room 510, the HMD 110 is made connected to the access point (AP) 310, which is a relay apparatus installed in advance in the room 510, to perform authentication processing. Through the authentication processing, the HMD 110 obtains the identification information on the access point 310. Then, the HMD 110 makes various kinds of information (display-related information) necessary for AR image display transmitted from the server 700 in association with the identification information on the access point 310. This enables the HMD 110 to identify to which of the rooms 510 the information belongs.

On the other hand, the server 700 makes the display-related information on each room 510 in association with the identification information on the access point 310 installed in each room 510 and manages them. Based on the identification information on the access point 310 through which a request of data transmission from the HMD 110 has passed, the server 700 identifies an area where the HMD 110 is present (room 510), and provides the HMD 110, which is a transmission source, with the display-related information which has been prepared for the room 510.

Hereinafter, in the present embodiment, spatial configuration information will be described as an example of the display-related information. The spatial configuration information is obtained by scanning the arrangement and shape of walls and installation objects of the room 510 and then mapping the scanned data. The spatial configuration information is used to grasp the shape of the inside of the room 510 surrounded by the walls and the arrangement and shape of furniture and the like installed in the room 510. Using this spatial configuration information enables AR objects to be arranged in a realistic manner. According to the arrangement in a realistic manner, for example, an AR object is prevented from being arranged behind a wall.

Generally, the spatial configuration information is generated, each time when the wearer of the HMD 110 enters a predetermined space such as the room 510, by scanning the space using various sensors provided in the HMD 110. However, this causes a large processing load.

In the present embodiment, since the server 700 and the HMD 110 themselves can easily identify an area where the HMD 110 is present (the room 510), if the spatial configuration information on each room 510 was created in the past, the previously created spatial configuration information is used.

Hereinafter, the present embodiment will be described by referring to an example in which the number of rooms is two (first room 511 and second room 512). The first room 511 is provided with a first access point 311, and the second room 512 is provided with a second access point 312. Furthermore, the number of HMDs 110 is not necessarily one, but may be two, i.e., a first HMD 111 and a second HMD 112. Hereinafter, the exemplary room 510 is referred to in the case where it is not necessary to distinguish the rooms. Similarly, the exemplary access point 310 and the exemplary HMD 110 are referred to, respectively, in the case where it is not necessary to distinguish the access points and the HMDs. Each access point 310 can transmit and receive data to and from the server 700 through a network 610.

[HMD]

First, the HMD 110 according to the present embodiment will be described.

[Appearance of HMD]

Figure 2A:
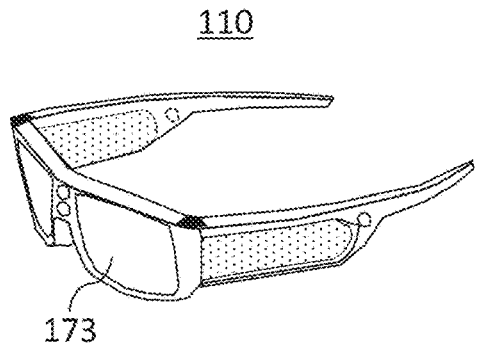
FIG. 2(a) illustrates an appearance of an HMD according to the first embodiment.
Figure 2B:
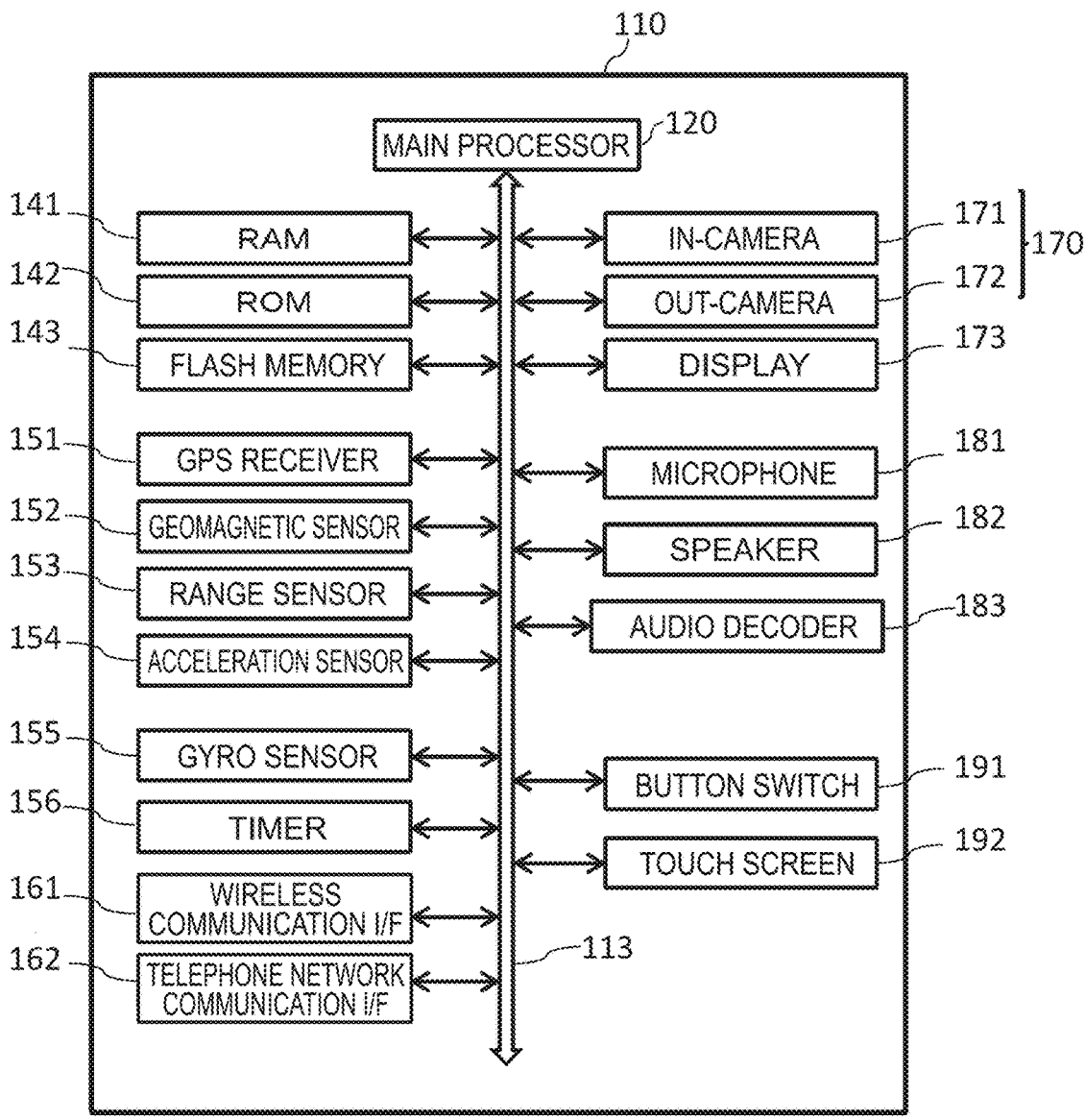
FIG. 2(b) is a hardware configuration diagram of the HMD according to the first embodiment.

FIG. 2(*a*) illustrates an appearance of the HMD 110 of the present embodiment. The HMD 110 illustrated in FIG. 2(*a*) is a see-through HMD 110. The HMD 110 includes a transmissive or semi-transmissive display 173. The wearer wearing the HMD 110 can see a virtual object or video displayed on the display 173, which is superimposed on the outside scenery.

Although not illustrated, the present embodiment is also applicable to an immersive HMD. The wearer wearing the immersive HMD does not directly see the surrounding scene, but sees a virtual world (virtual reality). Furthermore, the immersive HMD employs a video-through method, that is, uses data of an external field image captured by an out-camera 172 (see FIG. 2(*b*)) to see a video in which a virtual object is superimposed on the external field image. Although the present embodiment is applicable to any type described above, in the following, the see-through HMD 110 will be described as an example.

[Example of HMD Hardware Configuration]

FIG. 2(*b*) is a hardware configuration diagram illustrating an exemplary internal configuration of the HMD 110.

The HMD 110 includes a system bus 113, a main processor 120, a RAM 141, a ROM 142, a flash memory 143, a GPS (Global Positioning System) receiver 151, a geomagnetic sensor 152, a range sensor 153, an acceleration sensor 154, a gyro sensor 155, a timer 156, a wireless communication IF 161, a telephone network communication IF 162, an in-camera 171, the out-camera 172, a display 173, a microphone 181, a speaker 182, an audio decoder 183, a button switch 191, and a touch screen 192. These components are connected to the system bus 113.

The main processor 120 controls the entire operations of the HMD 110 in accordance with predetermined operation programs. The main processor 120 may be configured with any component such as a CPU, an MPU, or a dedicated logic circuitry.

The system bus 113 is a data communication channel that interconnects the main processor 120 with the respective components in the HMD 110. The main processor 120 and the components in the HMD 110 transmit and receive various commands, data, and the like through the system bus 113.

The RAM 141 defines a rewritable program work area, which is, for example, used by the main processor 120 at the time of execution of various programs.

Each of the ROM 142 and the flash memory 143 retains various programs for implementing the functions of the HMD 110, operation setting values, sensor information including values detected by sensors which will be described later, and various data for display such as virtual objects and content. The ROM 142 and flash memory 143 are so-called nonvolatile storages that retain stored data even when power is not supplied to the HMD 110 from the outside.

The flash memory 143 retains operation programs downloaded from a network and various data created by the operation programs. Through download processing from each server device on the network, it is possible to update and enhance each operation program stored in the flash memory 143.

Furthermore, the flash memory 143 can retain content such as moving images, still images, and sounds downloaded from a network. In addition, the flash memory 143 can retain data such as moving images and still images captured by the in-camera 171 or the out-camera 172.

The RAM 141, the ROM 142, and the flash memory 143 are examples of storages. Other devices, for example, a semiconductor memory element such as a solid state drive (SSD) or a magnetic disk drive such a hard disc drive (HDD) may be used therefor.

The main processor 120 is configured to acquire sensor information from the GPS receiver 151, the geomagnetic sensor 152, the range sensor 153, the acceleration sensor 154, and the gyro sensor 155, respectively, and also acquire a viewing time measured by the timer 156. Then, the main processor 120 uses the sensor information and the viewing time to detect the position, tilt, direction, movement, and the like of the HMD 110. Furthermore, the HMD 110 may further include other sensors, such as an illuminance sensor, a proximity sensor, an altitude sensor, and the like.

The wireless communication interface (I/F) 161 is connected to the network 610 such as the Internet through the access point 310 to transmit and receive data to and from each server 700 on the network 610. In the present embodiment, millimeter waves (60 GHz band) are used for wireless LAN connection to the access point 310 and the like. This is because the millimeter waves are highly directional and the radio waves are easily absorbed by the wall of the room. Using millimeter waves enables the HMD 110 to be connected to the access point 310 that is installed in the room 510 where the HMD 110 is surely present via the wireless LAN. Note that Wi-Fi (registered trademark) or Bluetooth (registered trademark) may be used for the wireless communication IF 161.

The telephone network communication I/F 162 is connected to a communication network through a base station (sometimes referred to as a cell tower.) using a mobile communication network to transmit and receive data to and from a server on a communication network according to the third-generation mobile communication system (hereinafter, referred to as "3G") such as Global System for Mobile Communications (GSM, registered trademark), Wideband Code Division Multiple Access (W-CDMA), CDMA 2000, or Universal Mobile Telecommunications System (UMTS). Similarly, the telephone network communication I/F 62 is connected to the communication network according to the Long-Term Evolution system (LTE), or a communication method such as so-called the fourth-generation system (4G) or fifth-generation system (5G).

Each of the wireless communication I/F 161 and telephone network communication I/F 162 includes an encoding circuitry, a decoding circuitry, an antenna, and the like.

Furthermore, the HMD 110 may include other communication interfaces such as an infrared communication I/F.

Each of the in-camera 171 and the out-camera 172 converts the light received through a lens into an electric signal using an electronic device such as a charge coupled device (CCD) or a complementary metal oxide semiconductor (CMOS) sensor to input image data of the surroundings and that of an object. Note that an exemplary camera 170 is referred to in the case where it is not particularly necessary to distinguish the in-camera 171 and out-camera 172.

The display 173 is, for example, a display device such as a liquid crystal panel, and provides the wearer of the HMD 110 with image data. The HMD 110 includes a video RAM (not illustrated). A virtual object or a video is displayed on the screen of the display 173 based on the image data received by the video RAM.

The microphone 181 converts the voice of the wearer into sound data and inputs the sound data.

The speaker 182 outputs sound information and the like.

The audio decoder 183 performs decoding processing of an encoded sound signal as necessary.

Each of the button switch 191 and touch screen 192 is an operation device used to input an operation instruction to the HMD 110. The operation device is not limited to the button switch 191 and the touch screen 192. For example, an operation signal to the HMD 110 may be transmitted from a separate portable device (for example, a smartphone or a tablet device) connected thereto by wired communication or wireless communication. Upon receiving the operation signal, the HMD 110 is operated in accordance with the received operation signal. Alternatively, based on the sound received by the microphone 181, the main processor 120 may execute sound recognition processing to generate an operation signal to control the operation of the HMD 110.

A part of the exemplary configuration of the HMD 110 illustrated in FIG. 2(*a*) is not essential to the present embodiment. Accordingly, even if the configuration of the HMD 110 does not include such an unessential component, the advantageous effects of the present embodiment are not impaired. In this connection, the configuration of the HMD 110 may further include components which are not illustrated, for example, a digital broadcast reception function and an electronic money settlement function.

[Functional Block of HMD]

Figures 3A, 3B:
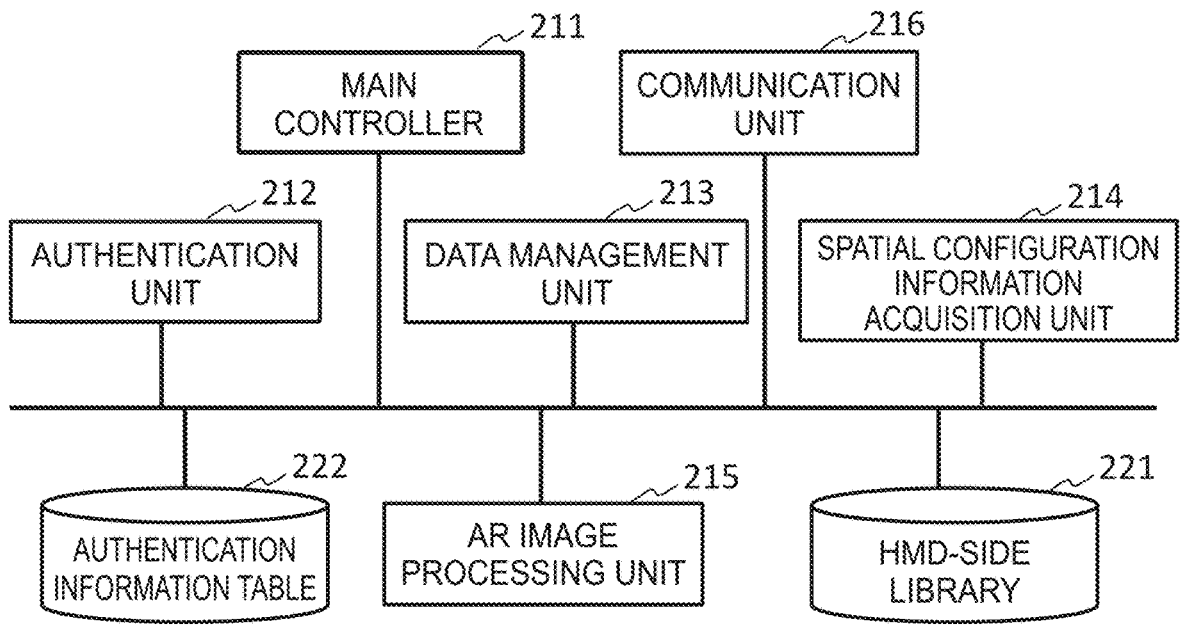
FIG. 3(a) is a functional block diagram of the HMD according to the first embodiment.
FIG. 3(b) illustrates an HMD-side library according to the first embodiment.

Next, a functional configuration of the HMD 110 according to the present embodiment will be described. FIG. 3(*a*) is a functional block diagram of the HMD 110 according to the present embodiment.

The HMD 110 of the present embodiment includes the functions of each of a main controller 211, an authentication unit 212, a data management unit 213, a spatial configuration information acquisition unit 214, an AR image processing unit 215, and a communication unit 216. The HMD 110 further includes an HMD-side spatial configuration information table (HMD-side library) 221 and an authentication information table 222. The main processor 120 loads a program stored in the ROM 142 or the flash memory 143 onto the RAM 141 and executes it, whereby the functions mentioned above are implemented. The HMD-side library 221 is provided in the ROM 142 or the flash memory 143.

The main controller 211 is configured to control the operations of each unit of the HMD 110.

The authentication unit 212 is configured to access the access point 310 installed in each room 510 to perform authentication. In the present embodiment, when receiving the network name (name of the wireless LAN network) of the access point 310 and the information identifying the access point 310 (access point ID) through the wireless communication IF 161, the authentication unit 212 transmits a password necessary for network connection to the access point 310. The password is stored in advance in the authentication information table 222. Upon receiving a notification that the authentication is successful from the access point 310, the authentication unit 212 provides the other functions such as the main controller 211 with a notification to the effect that.

The authentication information table 222 retains passwords required in various authentication, the names of the devices, and the like. In the present embodiment, for example, the authentication information table 222 retains the passwords for authentication required to establish connection to the access point 310.

The data management unit 213 is configured to manage the spatial configuration information and the like of the HMD-side library 221. The spatial configuration information is acquired by the spatial configuration information acquisition unit 214, which will be described later.

In the present embodiment, the data management unit 213 is configured to determine, firstly, the presence or absence of the spatial configuration information on the room 510 (hereinafter, referred to as the "own room") where the HMD 110 is currently present. The spatial configuration information on each room 510 is stored in the HMD-side library 221 in association with the access point ID provided to the room.

FIG. 3(*b*) illustrates an example of the HMD-side library 221 of the present embodiment. As illustrated in FIG. 3(*b*), in the HMD-side library 221, spatial configuration information 221*b* is registered in association with an access point ID 221*a* for each room 510. In addition, other display-related information such as AR image information 221*c* may be registered in the HMD-side library 221.

In the present embodiment, as the access point ID 221*a*, information identifying the access point 310 acquired in the authentication is used. For example, a MAC address of the access point 310 may be used as the access point ID 221*a*.

In this connection, for example, in the case where the spatial configuration information relating to the room 510 is not stored in association with the access point ID 221*a*, the data management unit 213 requests the server 700 to transmit the spatial configuration information on the room 510. This request is made through the access point 310.

When receiving the spatial configuration information from the server 700 through the access point 310, the data management unit 213 stores, in the HMD-side library 221, the received spatial configuration information 221*b* in association with the access point ID 221*a*. On the other hand, when receiving a reply that the spatial configuration information is not registered from the server 700, the data management unit 213 instructs the spatial configuration information acquisition unit 214 to acquire the spatial configuration information.

The data management unit 213 obtains the spatial configuration information on the room 510 stored in the server 700, and stores it in the HMD-side library 221.

When receiving the instruction to acquire the spatial configuration information from the data management unit 213, the spatial configuration information acquisition unit 214 creates the spatial configuration information on an area where the own device (HMD 110) is currently present (room 510). The spatial configuration information acquisition unit 214 registers the created spatial configuration information 221*b* in the HMD-side library 221. At this time, the created spatial configuration information is registered in association with the access point ID 221*a* acquired by the authentication unit 212.

In the present embodiment, the spatial configuration information acquisition unit 214 is configured to scan and capture images of the walls of the room 510, arrangement and shape of the installation objects, and the like with the camera 170. Then, the spatial configuration information acquisition unit 214 performs mapping with respect to the captured image data to acquire the spatial configuration information on the room 510.

The AR image processing unit 215 is configured to generate an AR image using the AR image information 221*c*, and display the generated AR image on the display 173. The AR image processing unit 215 displays the AR image when the display position of the generated AR image is within the visual field of the wearer of the HMD 110. The HMD 110 itself determines whether the display position of the AR image is in within the visual field of the HMD 110 by determining the display position of the AR image.

For example, the AR image information 221*c* may be acquired from the server 700 and stored in the HMD-side library 221. Alternatively, the server 700 may determine the display position of the AR image based on the visual filed information on the HMD 110 which has been transmitted to the server 700, and transmit the necessary AR image information 221*c* to the HMD 110.

The communication unit 216 is configured to transmit and receive data to and from an external device via the wireless communication IF 161. In the present embodiment, the communication unit 216 transmits data to the access point 310 via the wireless communication IF 161 and receives data transmitted from the access point 310.

The HMD 110 of the present embodiment may further include, for example, a captured image data storage unit for storing the image data captured by the camera 170. All data other than authentication information may be stored in the outside, for example, a device such as a server connected via a network. In this case, the data is acquired from such a server via the wireless communication IF 161.

[Access Point]

The access point 310 is configured in the similar manner as a conventional access point. In the present embodiment, the access point 310 is a wireless device that includes a router function for connecting a wireless LAN client such as the HMD 110 to another network.

In the present embodiment, as described above, since the server 700 identifies in which of the rooms 510 the HMD 110 is present based on the information identifying the access point 310, each room 510 is provided with at least one access point 310. Furthermore, in order to prevent the HMD 110 from being connected to other access points 310 of other rooms 510, in the present embodiment, for example, millimeter waves (60-GHz band) are used for the wireless LAN connection between the HMD 110 and the access point 310.

Note that the wavelength of electromagnetic waves in use is not limited thereto. Electromagnetic waves of any wavelength band may be used as long as they are hardly connected to other access points 310 of other rooms and thus are reliably connected to the access point 310 of the own room.

Furthermore, preferably, installing each access point 310 near the center of each room 510 allows the HMD 110 to be connected to the access point 310 regardless of the position of the wearer of the HMD 110 within the room 510.

Since each access point 310 is configured with a media access control (MAC) address, which is a unique physical address, the MAC address may be used as an access point ID identifying the access point 310. Instead of a MAC address, an internet protocol (IP) address, which is a logical address, or a unique access point name can be used. Hereinafter, in the present embodiment, the case where a MAC address is used will be described as an example.

[Server]

Next, the server 700 according to the present embodiment will be described. The server 700 of the present embodiment retains the information relating to AR display as the display-related information on each room 510 to be managed. Then, in response to a request from the HMD 110, the sever 700 provides the display-related information on the room 510 where the HMD 110, which is the request source, is present. This function is similar to that of the conventional AR server.

[Server Hardware Configuration]

FIG. 4(a) illustrates an exemplary hardware configuration of the server 700 according to the present embodiment. As illustrated in FIG. 4(a), in the similar manner as a general server, the server 700 includes a processor (main processor) 720, a storage device (server storage device) including a RAM 741, a ROM 742, a flash memory 743, and the like, and a communication interface (I/F) 761. The sever 700 may further include a display 773, an operation device 791, and the like. These components are configured in the same manner as the components of the same names of the HMD 110, and thus the repetitive explanation therefor will be omitted.

[Configuration of Server Functions]

FIG. 4(b) is a functional block diagram of a part of the server 700 according to the present embodiment, which relates to the processing according to the present embodiment. As illustrated in FIG. 4(b), the server 700 includes a spatial configuration information management unit 721 and server-side spatial configuration information (hereinafter, referred to as a server-side library) 730.

The spatial configuration information management unit 721 is configured to manage data stored in the server-side library 730. In the present embodiment, the spatial configuration information management unit 721 provides, in response to a request from the HMD 110, the spatial configuration information on the room 510 where the access point 310 through which the request has passed is present. Before providing the spatial configuration information, the spatial configuration information management unit 721 checks whether the spatial configuration information is registered in the server-side library 730 in association with the access point ID (MAC address) of the access point 310 included in the request data. If it is registered, the spatial configuration information management unit 721 provides the registered spatial configuration information. If it is not registered, the spatial configuration information management unit 721 provides the HMD 110 with data indicating that it is not registered.

In response to the data indicating that it is not registered, in the case where the spatial configuration information is transmitted, the transmitted spatial configuration information is registered in the server-side library 730 in association with the access point ID of the relayed access point 310.

FIG. 4(c) illustrates an example of the server-side library 730. As illustrated in FIG. 4(c), in the server-side library 730, the display-related information (including spatial configuration information) of each room 510 is registered. The server-side library 730 includes, for each room 510, a room number 731 used to identify a room, an access point ID 732, spatial configuration information 733 of the room 510, and information (AR image information) 735 on an augmented reality image (AR image) generated by a computer. The server-side library 730 may further include sound information relating to the room 510 and other information relating to the room 510, and may not include the room number 731.

In the server-side library 730 illustrated in FIG. 4(c), the data of which the room number 731 is "room 511" includes "Adrs01" as the access point ID 732, "Map01" as the spatial configuration information 733, "AR01" as the AR image information 735, "Snd01" as the sound information, and "Othr01" as other information. Similarly, the data of each of the room 512 to room n includes the ones as illustrated in FIG. 4(c).

In the present embodiment, the server 700 includes the server-side library 730 configured as described above. Thus, if the access point ID of the access point 310 is found, the room 510 is identified and all information about the room 510 is available.

In the server-side library 730, basically, it is preferable to acquire the spatial configuration information 733, AR image information 735, sound information, and other information relating to each room 510 in advance and register them in association with the room number 731 and the access point ID 732. In particular, it is preferable to generate the spatial configuration information 733 of each room 510 in advance by the general HMD 110 or the like and register it in the server-side library 730.

On the other hand, in the present embodiment, in the case where no data of the access point ID 732 of the relayed access point 310 is registered, the transmitted spatial configuration information is newly registered. That is, in the present embodiment, the server-side library 730 can be replenished later.

The server-side library 730 is stored in a storage device of the server 700.

[Spatial Configuration Information Acquisition Processing]

Hereinafter, a flow of initial processing (spatial configuration information acquisition processing) performed when the HMD 110 enters the room 510 by the presence area identification system 100 according to the present embodiment, which is an information processing system capable of identifying an area where an HMD is present, will be described.

As described above, generally, each time a wearer of the HMD 110 enters a new room 510, firstly, various sensors provided in the HMD 110 are used to collect the spatial configuration information on the room 510. However, in the present embodiment, since an area where an HMD is present can be identified, the spatial configuration information created in the past can be managed in association with (the access point 310 provided in) the room 510, and thus can be used later.

Figure 5:
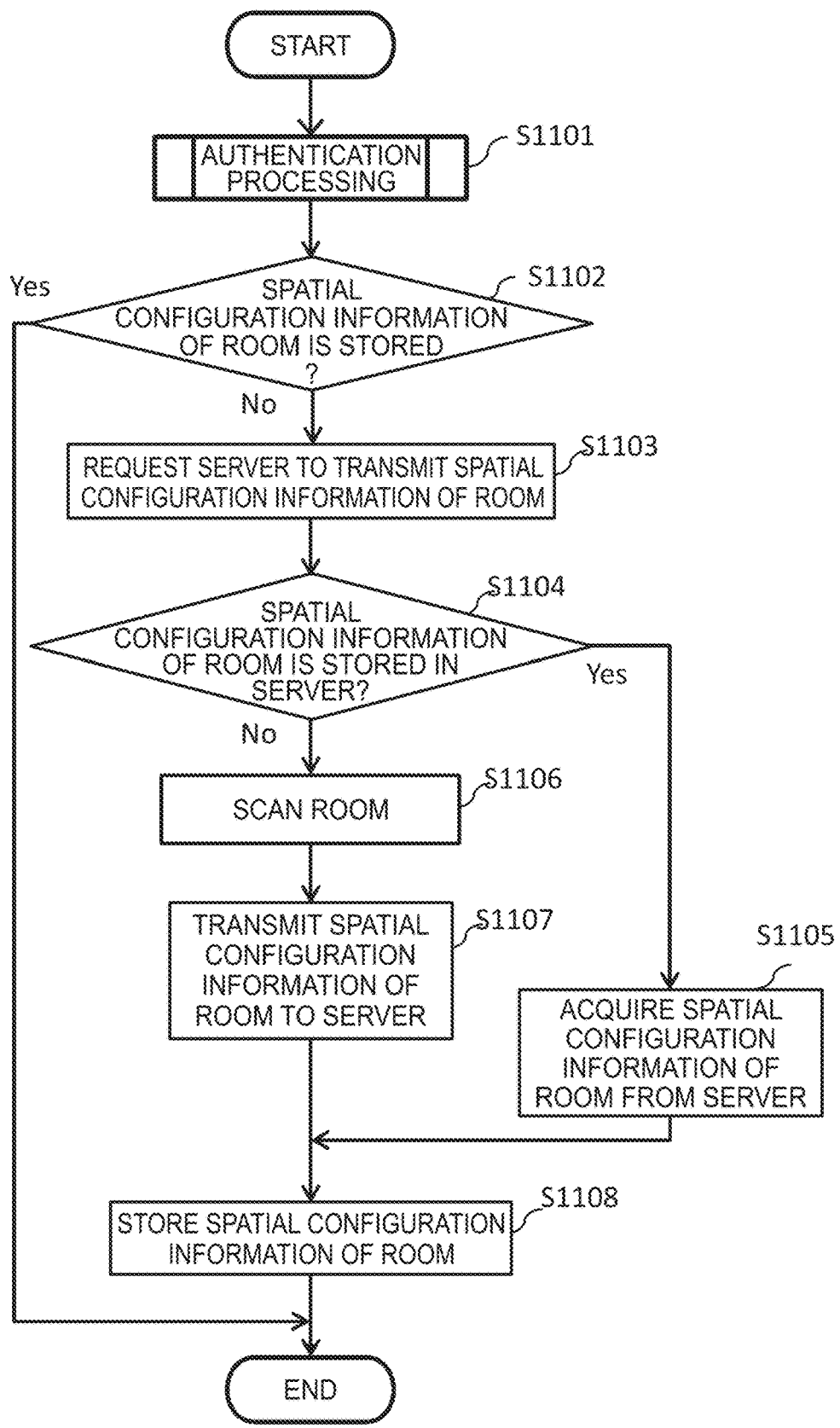
FIG. 5 is a flowchart of spatial configuration information acquisition processing according to the first embodiment.

Hereinafter, the spatial configuration information acquisition processing according to the present embodiment will be described with reference to FIG. 5.

This processing is started when the HMD 110 is activated. Alternatively, it is started in accordance with an instruction from the wearer. For example, when entering the predetermined room 510, the wearer provides the HMD 110 with the instruction to perform the initial spatial configuration information acquisition processing. Further alternatively, the HMD 110 may be configured to detect the network name of the access point 310 and automatically initiate this processing.

Firstly, the authentication unit 212 performs the authentication processing in order to establish connection to the access point 310 of the wireless LAN (step S1101). Details of the authentication processing will be described later.

After the authentication processing is performed by the authentication unit 212 and the connection to the wireless LAN through the access point 310 is confirmed, the data management unit 213 determines whether the spatial configuration information on the room 510 is stored in the HMD 110 (step S1102).

If it is stored (step S1102; Yes), the data management unit 213 ends the processing as it is.

On the other hand, if it is not stored (step S1102; No), the data management unit 213 requests the server 700 to transmit the spatial configuration information on the room 510 through the access point 310 (step S1103). Then, the data management unit 213 distinguishes the content of a reply provided in response to the request (step S1104).

If the reply indicates that the spatial configuration information is available (step S1104; Yes), the data management unit 213 acquires (downloads) the spatial configuration information to be provided from the server 700 (step S1105), and registers the acquired spatial configuration information in the HMD-side library 221 (step S1108). At this time, the data management unit 213 registers the spatial configuration information 221*b* in association with the access point ID 221*a* of the access point 310 acquired by the authentication unit 212, and ends the processing.

On the other hand, when the reply does not include the spatial configuration information (step S1104; No), the data management unit 213 instructs the spatial configuration information acquisition unit 214 to acquire the spatial configuration information.

In response to the instruction, the spatial configuration information acquisition unit 214 scans the room 510 (step S1106) to acquire the mapped spatial configuration information. Then, the spatial configuration information acquisition unit 214 transmits the acquired spatial configuration information to the server 700 (step S1107), and also registers it in the HMD-side library 221 in association with the access point ID of the access point 310 acquired by the authentication unit 212 (step S1108). At this time, the acquired spatial configuration information is transmitted to the server 700 through the access point 310. Then, the spatial configuration information acquisition unit 214 ends the processing.

Figure 6:
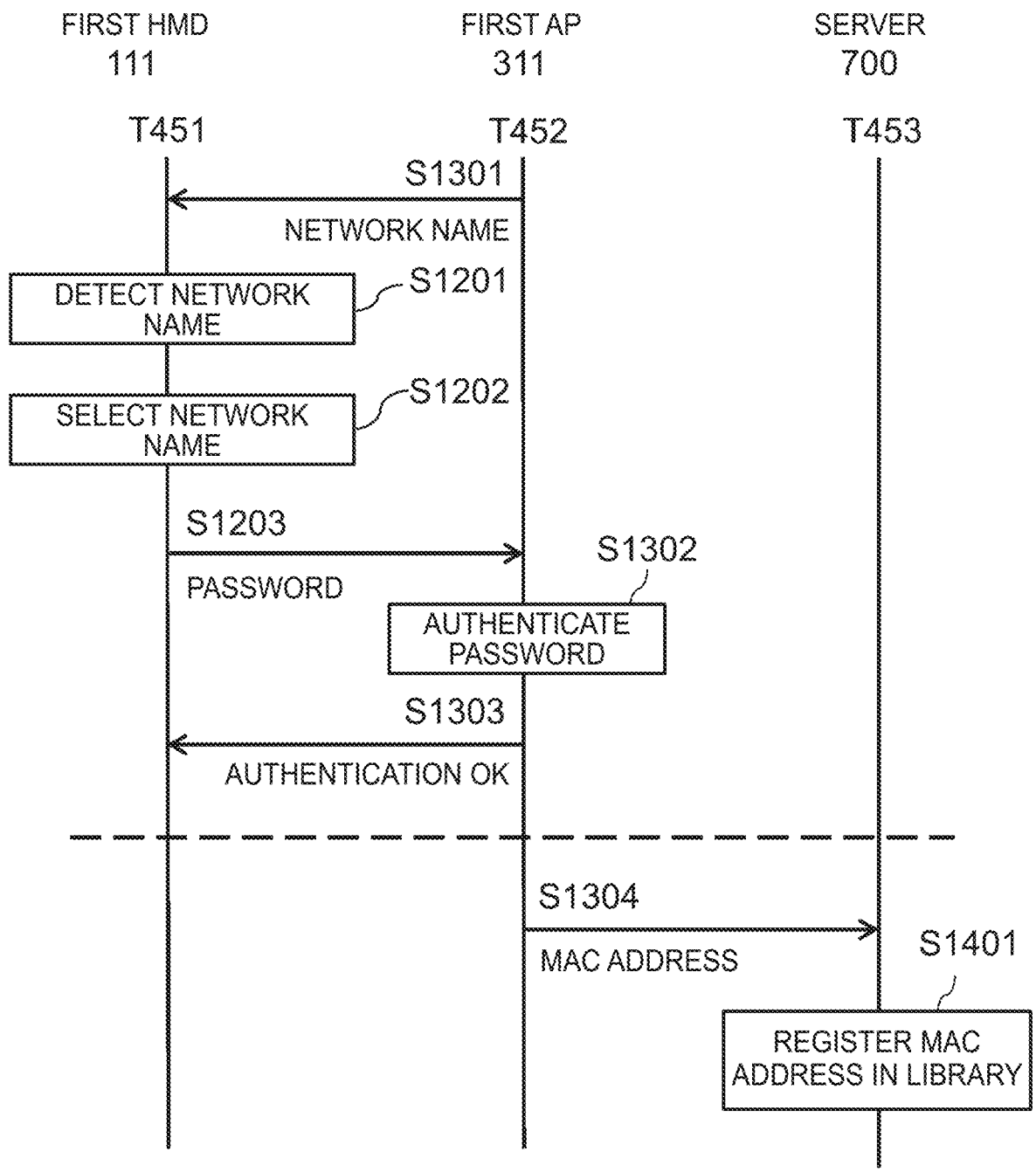
FIG. 6 is a time chart illustrating authentication processing according to the first embodiment.

Next, transmission and reception of data between the devices during the authentication processing will be described. FIG. 6 is a time chart illustrating the transmission and reception of data between the first HMD 111 and first access point 311, which are provided in the first room 511 of FIG. 1, and the server 700.

The time chart includes a total of three time-axes, i.e., a time axis T451 for the processing by the first HMD 111, a time axis T452 for the processing by the first access point 311, and a time axis T453 for the processing by the server 700.

From each access point 310, the network name of the access point 310 (network name of the wireless LAN) is constantly transmitted to devices including the HMD 110, which are ready to be connected via the wireless LANs. Thus, the network name of the access point is also transmitted from the first access point 311 (step S1301).

The first HMD 111 detects the transmitted network names (step S1201), and selects, as a connection target, one of the network names desired by the wearer of the first HMD 111 from among the obtained network name group (step S1202). In the present embodiment, only one access point 310 is installed in each room 510. Furthermore, millimeter waves are used for the communication between the HMD 110 and the access point 310 since using the millimeter waves prevents the HMD 110 from being connected to the access points other than the access point 310 of the room 510. Thus, in the present embodiment, the first HMD 111 can detect only the network name transmitted from the first access point 311 installed in the first room 511, and select the detected network name as the connection target.

Subsequently, the first HMD 111 transmits an authentication request to the first access point 311. Here, the first HMD 111 notifies the first access point 311 of a password required for the network connection (step S1203). The authentication unit 212 acquires the password from the authentication information table 222 and transmits it to the first access point 311.

The first access point 311 authenticates the received password (step S1302). The first access point 311 verifies, for each connectable network, whether the received password matches the password necessary for connection with the network, which is registered in advance. If it matches the registered password, the authentication is successful. If successful, the connection between the first HMD 111 and the first access point 311 is established via the wireless LAN. The first access point 311 transmits a signal for permitting the authentication (authentication OK) to the first HMD 111 (step S1303).

Since the authentication processing between the first HMD 111 and the first access point 311 is performed in the same manner as general wireless LAN connection processing, detailed explanation thereof will be omitted here.

In order to enhance the security of the network, not only password authentication but also identity document (ID) authentication may be performed. Furthermore, an authentication server that authenticates both an ID and password may be additionally provided so that password authentication may be performed by the authentication server.

After the connection is established between the first HMD 111 and the AP 311, that is, if the authentication is successful in step S1302, the first access point 311 transmits the identification information identifying the first access point 311 to the server 700 (step S1304). In the present embodiment, the MAC address, which is a physical address unique to the device, is used as the identification information. If the password authentication fails in step S1302, the process in step S1304 is not performed.

In the server 700, the spatial configuration information management unit 721 verifies whether the received MAC address is registered in the server-side library 730.

If the MAC address is not registered, the spatial configuration information management unit 721 determines that the received MAC address is a new MAC address (new room) and registers it as the access point ID 732 in the server-side library 730 (step S1401). Thus, the MAC address of the first access point 311 installed in the first room 511 where the first HMD 111 is present is registered in the server 700. The server 700 recognizes that the first HMD 111 is present in the first room 511 in which the first access point 311 having the newly registered MAC address is installed.

If it is determined in step S1401 that the MAC address is registered, the server 700 recognizes that the first HMD 111 is present in the first room 511 in which the first access point 311 having the corresponding MAC address is installed.

Thereafter, when the first HMD 111 requests transmission of the spatial configuration information through the first access point 311, the spatial configuration information management unit 721 confirms the presence or absence of the corresponding spatial configuration information. The confirmation is made based on whether the spatial configuration information 733 is registered in the server-side library 730 in association with the MAC address of the first access point 311 which is the transmission source.

If the spatial configuration information 733 is registered, the spatial configuration information management unit 721 transmits the registered spatial configuration information 733 to the transmission source. On the other hand, if it is unregistered, the spatial configuration information management unit 721 provides the transmission source with a notification to the effect that.

After transmitting the notification that the spatial configuration information 733 is not registered, if receiving the spatial configuration information through the first access point 311, the spatial configuration information management unit 721 registers the received spatial configuration information 733 in the server-side library 730 in association with the MAC address of the first access point 311.

As described above, according to the present embodiment, when the wearer enters the room 510, the HMD 110 is authenticated by the access point 310, which is installed in the room, to be connected thereto, and then makes the room associated with the access point. After providing the HMD 110 with the connection authentication, the access point 310 transmits a MAC address to the server 700 as the identification information on the access point 310. Upon receiving the MAC address, the server 700 recognizes that the HMD 110 is present in the room 510 registered in association with the MAC address. The MAC address and the room 510 are made associated with each other and stored in advance in the server-side library 730 by the server 700.

As described above, in the present embodiment, the server 700 uses the identification information on the access point used by the wireless LAN to identify an area where the HMD 110 is present, i.e., the room 510 where the HMD 110 is present. As a result, an area where the HMD 110 is present can be easily grasped only with the existing devices. That is, it is possible to identify an area where the HMD 110 is present without providing additional hardware.

Furthermore, according to the present embodiment, the HMD 110 can provide the server 700 with the information necessary for identifying an area where the HMD 110 is present simply by performing the general authentication processing with the access point 310. That is, the HMD 110 enables the servers 700 to grasp the room 510 where the own device is present without requesting a new instruction or the like from the wearer.

Still further, according to the present embodiment, information for uniquely identifying the access point 310 installed in each room 510 is used to identify an area where the HMD 110 is present. Accordingly, although, for example, the GPS has a restriction of location identification in the height direction, there is no such a restriction in the present embodiment. That is, in the case where an HMD is present in a building or the like of a plurality of stories, it is difficult for the GPS to distinguish the positions on the same plane even if they are of the different stories. On the other hand, according to the present embodiment, even in such a case, it is possible to accurately identify the area where the HMD 110 is present.

As described above, according to the present embodiment, since the server 700 can easily identify an area where the HMD 110 is present with sufficient accuracy, it is possible to appropriately provide the HMD 110 with various kinds of display-related information that was created in the past and is required for the AR display simply by managing the display-related information for each area where the HMD is to be present. Furthermore, the HMD 110 can appropriately receive the display-related information managed by the server 700.

Conventionally, the spatial configuration information needs to be generated each time the wearer of the HMD 110 moves between the rooms 510, which causes a burden to the processing of the HMD 110. On the other hand, according to the present embodiment, since the server 700 can easily grasp the room 510 where the HMD 110 has entered, in the case where the server 700 manages the spatial configuration information created in the past, the spatial configuration information can be provided from the server 700.

Therefore, according to the present embodiment, it is possible to greatly reduce the processing burden which may be caused when the HMD 110 enters a room.

<First Modification>

In the embodiment described above, the access point 310 and the wireless LAN are used to identify the room 510 where the HMD 110 is present. However, a relay apparatus used to identify the room 510 is not limited to the access point 310. For example, a base station of mobile phones may be used.

Figure 7A:
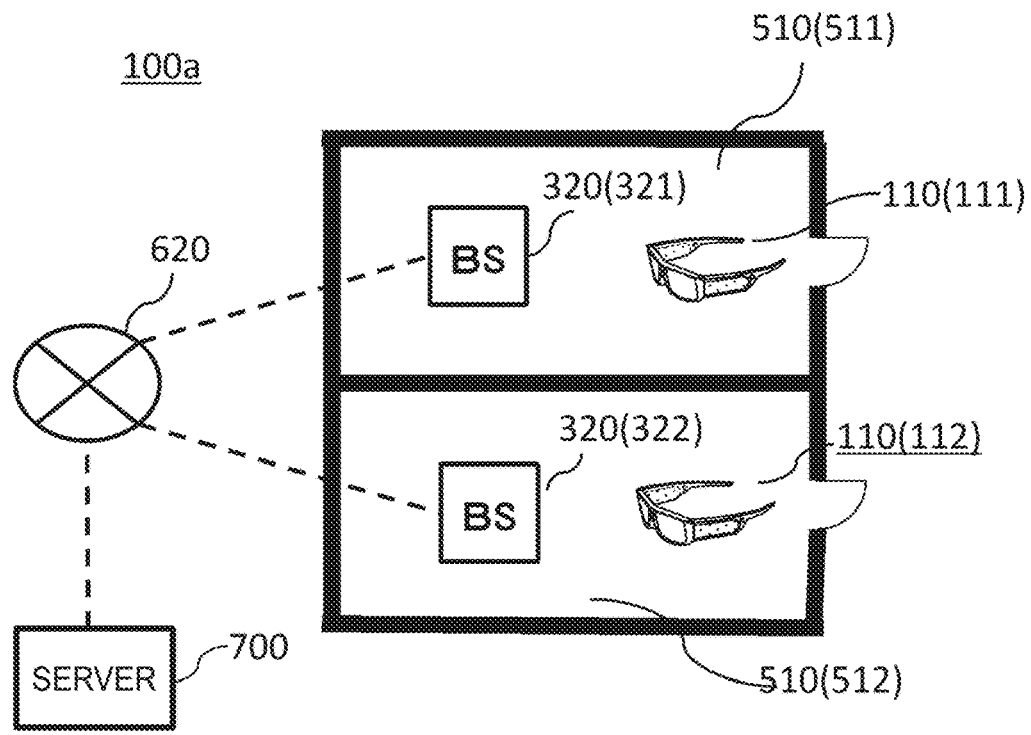
FIG. 7 Each of FIG. 7(a) and FIG. 7(b) illustrates an outline of a presence area identification system according to the first modification.
Figure 7B:
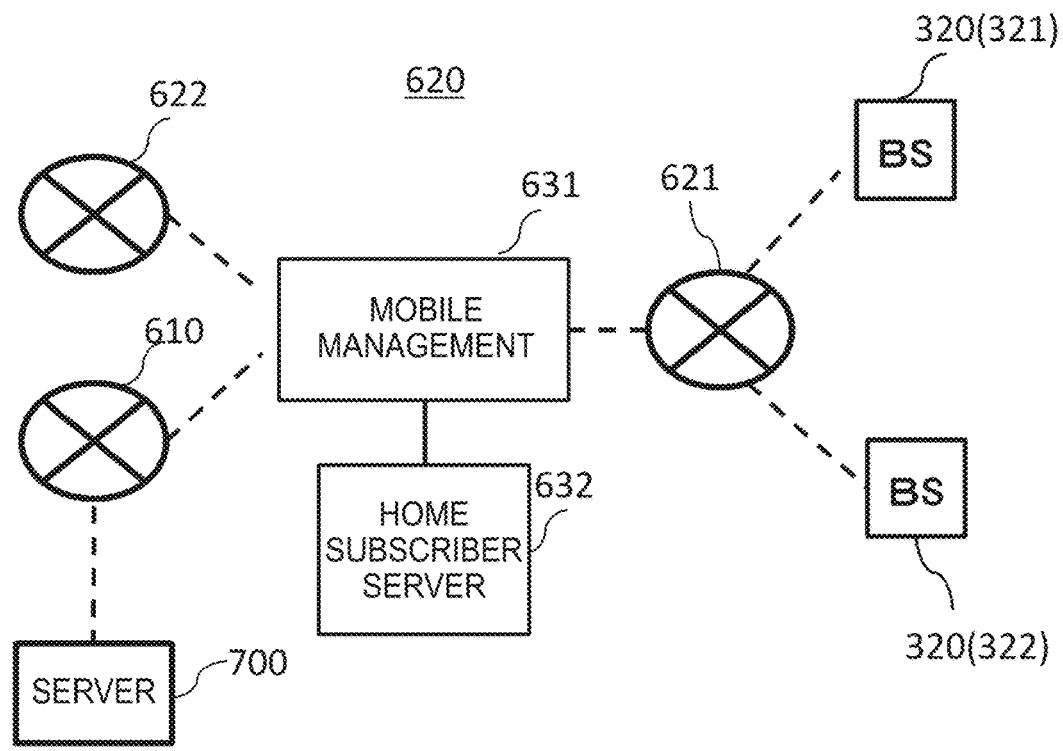

Hereinafter, a method of identifying the room 510 where the HMD 110 is present by using a base station of mobile phones as a relay apparatus will be described. FIG. 7(a) illustrates an outline of the present modification.

A presence area identification system 100a according to the present modification is basically configured in the same manner as the embodiment described above, while the difference therebetween is found in that the presence area identification system 100a uses a base station (hereinafter, referred to as a "BS") 320 of mobile phones instead of the access point 310 which is used as a relay apparatus in the embodiment described above. FIG. 7(a) illustrates an example in which a first BS 321 is installed in the first room 511, and a second BS 322 is installed in the second room 512.

Thus, the network to which the BS 320 is connected is a mobile phone network 620 rather than the network 610 such as the Internet. In order to establish the connection to the server 700 through the mobile phone network 620, a mobile management 631 is provided between the BS 320 and the server 700.

The mobile management 631 is located at the core of the mobile phone network, and configured to manage the mobile phone network together with a home subscriber server 632 that retains subscriber information. The BS 320 provided in each room 510 is connected to the mobile management 631 via the mobile phone network 621. Then, each BS 320 is connected to the network 610 through the mobile management 631 to access the server 700.

Note that the mobile management 631 is connected to other mobile phone networks 622 which are connected to a plurality of mobile phone base stations (not illustrated).

In the present modification, the BS 320 is wirelessly connected to the HMD 110, which is as a mobile phone, using millimeter waves (28 GHz band) which are the 5G standard of mobile phones. The millimeter waves are highly directional and the radio waves are easily absorbed by the walls of the room 510. Since using the millimeter waves surely enables the HMD 110 which is present in the room 510 to be wirelessly connected to the BS 320 that is installed in the room 510, the HMD 110 is prevented from being connected to other BSs 320 installed in other rooms 510.

Each BS 320 is provided with a unique BS-ID (sometimes referred to as Cell-ID). Accordingly, when the correspondence between the room 510 and the BS-ID of the BS 320 installed in the room 510 is found, the room 510 can be identified based on the BS-ID of the BS 320.

Hereinafter, the present modification will be described while focusing on the points different from the first embodiment.

The HMD 110 is basically configured in the same manner as that of the first embodiment. On the other hand, as illustrated in FIG. 8(*a*), the spatial configuration information (HMD-side library 221) of each room 510 held by the HMD 110 is stored in association with a BS-ID 221*d* of the BS 320 installed in each room 510.

Similarly, the server 700 is basically configured in the same manner as that of the embodiment described above, while the difference therebetween is found in that, as illustrated in FIG. 8(*b*), the server-side library 730 is managed in association with the BS-ID 732*b* instead of the MAC address of the access point 310.

Note that, there may be cases where some rooms 510 are provided with the access points 310 while other rooms are provided with the BSs 320. In this case, the spatial configuration information is stored for each room 510 in association with the identification information on a relay apparatus installed in each room 510.

The spatial configuration information acquisition processing by the HMD 110 is also basically the same as that by the embodiment described above, while in the authentication processing, instead of the authentication processing to establish the connection to the access point 310, processing to establish the connection to the BS 320 is performed.

Hereinafter, transmission and reception of data between the devices in the authentication processing according to the present modification will be described.

Figure 9:
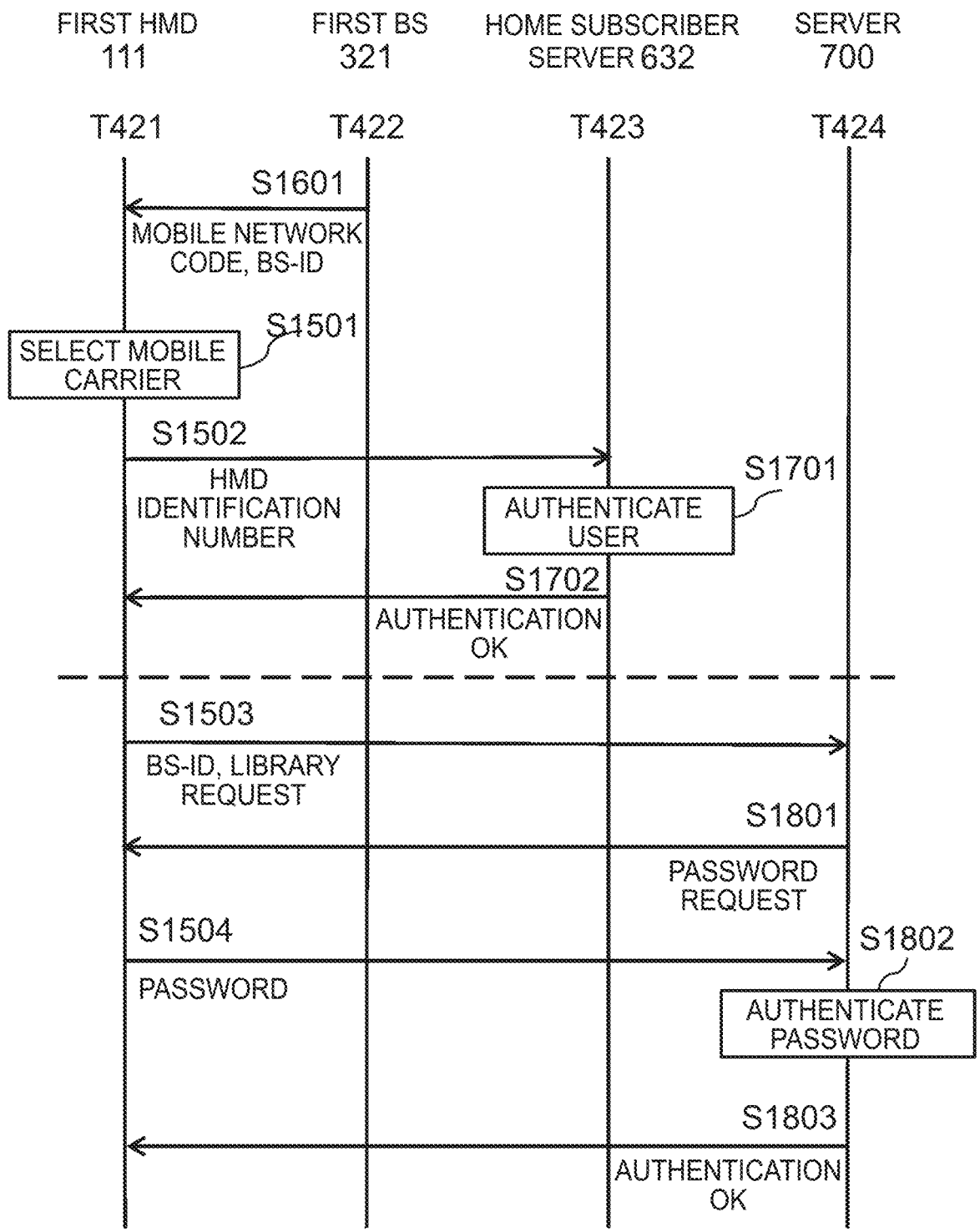
FIG. 9 is a time chart illustrating authentication processing according to the first modification.

FIG. 9 is a time chart of the authentication processing according to the present modification. Here, the present embodiment and transmission and reception of data between the first BS 321, the home subscriber server 632, and the server 700 will be described. FIG. 9 includes a total of four time-axes, i.e., a time axis T421 for the processing by the first HMD 111, a time axis T422 for the processing by a BS 321, a time axis T423 for the processing by the home subscriber server 632, and a time axis T424 for the processing by the server 700.

Generally, each BS 320 always notifies mobile phone devices (HMDs 110) that are connectable thereto of a mobile network code and a BS-ID. In the present modification, similarly, the first BS 321 notifies the first HMD 111 of the mobile network code and BS-ID (step S1601).

The first HMD 111 detects the notified mobile network code and selects a desired mobile carrier (step S1501). The first HMD 111 uses the corresponding mobile phone carrier information stored in a SIM card built in the first HMD 111 to select the BS 321 provided by the corresponding mobile carrier. The first HMD 111 holds the mobile network code and BS-ID of the selected BS 321.

The first HMD 111 stores the identification number of the first HMD 111, which is being used as a mobile phone, in the SIM card built in the own device. The first HMD 111 transmits the stored identification number to the home subscriber server 632 through the BS 321 (step S1502).

The home subscriber server 632 uses the identification number of the first HMD 111 received in step S1502 in the user authentication (step S1701). The home subscriber server 632 authenticates a user by comparing the identification number with the subscriber information registered in advance in the home subscriber server 632 and determining whether they match. If the received identification number matches the subscriber information, the authentication is successful, and thus the home subscriber server 632 transmits a signal indicating that the authentication is successful (authentication OK) to the first HMD 111 (step S1702).

Since the authentication processing between the first HMD 111 and the first BS 321 described above is performed in the same manner as the general mobile phone connection processing, detailed explanation thereof will be omitted here.

Furthermore, when the authentication is successful in step S1701, the first HMD 111 transmits, together with the received BS-ID, a request of transmission of the spatial configuration information to the server 700 (step S1503).

In response to this request, in order to confirm whether the spatial configuration information may be transmitted to the first HMD 111 that is the request source, the server 700 requests the first HMD 111 to transmit a password (step S1801). In response to this request, the first HMD 111 transmits the password to the server 700 (step S1504). The password for this authentication is registered in advance in the server 700.

The server 700 authenticates the received password (step S1802). If the received password matches the password for authentication, the server 700 transmits a signal indicating that the authentication is successful (authentication OK) to the first HMD 111 (step S1803).

After the authentication by the server 700 is successful, in the same manner as the first embodiment, the first HMD 111 acquires the spatial configuration information on the first room 511 where the own device is present from the server 700 as needed.

As described above, according to the present modification, using a base station of a mobile phone network used by mobile phones enable the server 700 to identify an area where an HMD is present (room 510). As a result, like the embodiment described above, an area where the HMD 110 is present can be easily grasped only with the existing devices. That is, it is possible to identify an area where the HMD 110 is present without providing additional hardware.

Furthermore, according to the present modification, like the embodiment described above, the HMD 110 simply performs the general authentication processing for establishing communication, whereby the server 700 can grasp an area where the HMD 110 is present. That is, the HMD 110 can provide the server 700 with the information necessary for identifying an area where the own device is present without requesting the wearer to provide a new instruction or the like.

Thus, according to the present modification, it is possible to obtain the same advantageous effects as those of the embodiment above.

<Second Modification>

In the first modification, using millimeter waves which have a high directivity and attenuation rate is assumed, however, the present invention is not limited thereto.

Recently, a mobile phone network designed with a femtocell, which is a low power mobile phone base station, has been provided. Since a coverage area of the femtocell is much narrower than that of a conventional cell, it is very likely that such a mobile phone base station in the room 510 will receive an output from a device in the room 510. Therefore, a mobile phone base station designed with the femtocell may be used.

<Third Modification>

In the embodiment above, the access point 310 is connected to the server 700 via the wireless LAN and accesses the server 700 through the network 610 such as an Internet network, however, the present invention is not limited thereto. For example, as illustrated in FIG. 1(*b*), instead of the network 610, a wired LAN network 630 may be used. In this case, instead of the access point 310, a relay apparatus such as a hub (HUB) 340 (341, 342) is used.

Using the wired LAN will give the advantageous effects of reducing the risk of information leakage through the Internet network, in addition to the advantageous effects which can be obtained by the embodiment and modifications above.

Second Embodiment

Next, a second embodiment of the present invention will be described. In the present embodiment, a plurality of access points 330 is provided in one room 510. Some of the access points 330 are different from others in their performance.

Hereinafter, the present embodiment will be described while focusing on the points different from the first embodiment.

Figures 10A, 10B:
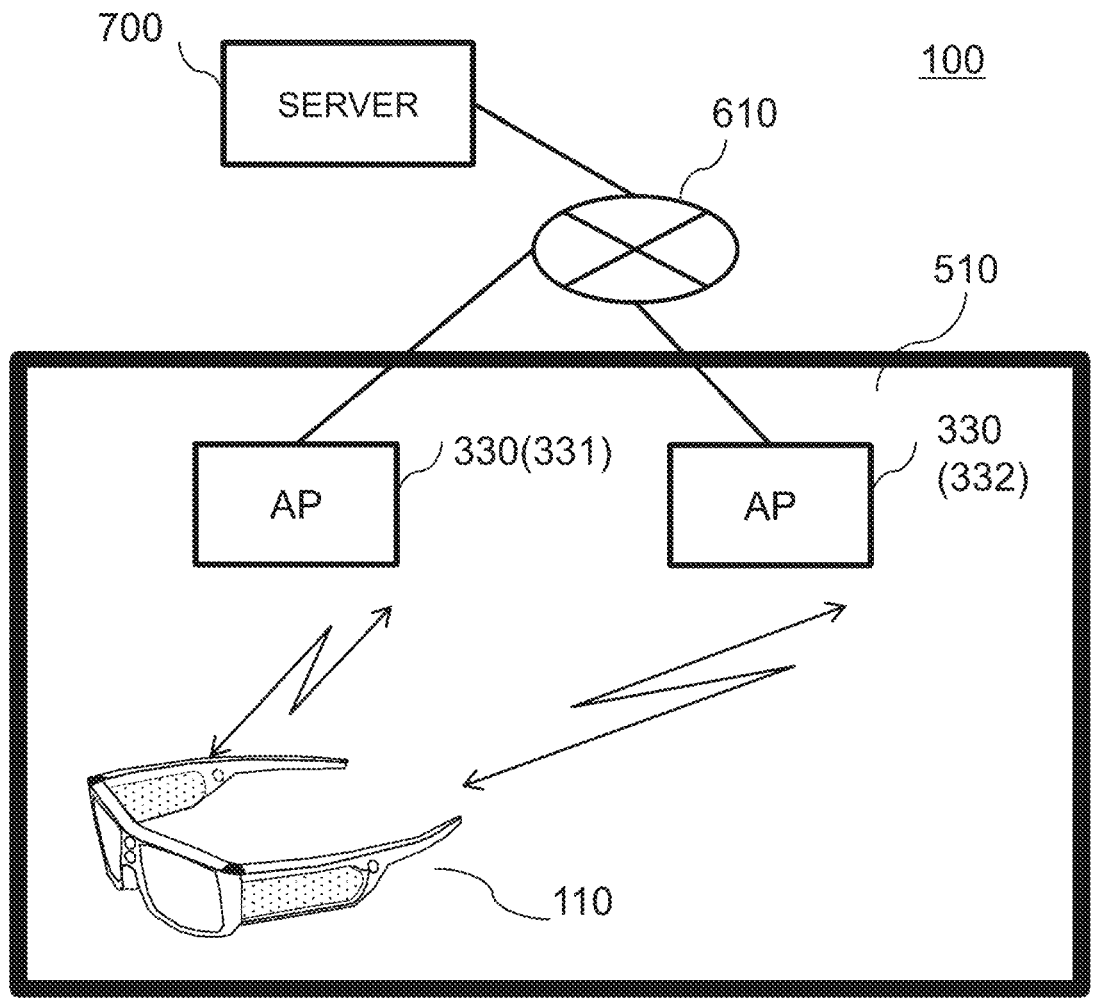
FIG. 10(*a*) illustrates an outline of a presence area identification system according to the second embodiment, and FIG. 10(*b*) illustrates an outline of performance of each access point according to the second embodiment.

FIG. 10(*a*) illustrates an outline of an operating environment of the presence area identification system 100 according to the present embodiment. In order to simply explain, an example of the presence area identification system 100 including, as the plurality of access points 330, a total of two systems, i.e., an access point 331 and an access point 332 will be described. The presence area identification system 100 may be configured to be connectable to the server 700 via three or more systems of wireless LANs of different transmission standards.

FIG. 10(*b*) illustrates a table 520 showing the difference in performance between the access point 331 and the access point 332. The access point 331 and the access point 332 are different from each other in performance, such as connection speed and the presence or absence of limit of data volume. This information may be held in, for example, the HMD 110 or the server 700. Note that they may have a difference in the amount of money to be charged.

As illustrated in FIG. 10(*b*), in the case of the access point 331, the connection speed is medium, data volume is limited, and advertisements are included. On the other hand, in the case of the access point 332, the connection speed is high, data volume is not limited, and no advertisements are included.

Thus, for example, in the case of transmitting and receiving the spatial configuration information or AR image information, using the access point 332 as a relay apparatus enables transmission and reception of more detailed data in a short time.

Furthermore, in the present embodiment, the server 700 determines that the HMD 110 is present in the room 510 when the HMD 110 is connected thereto via any of the access points 330 installed in the room 510. On the other hand, the server 700 may hold, as the server-side library 730, the spatial configuration information and AR image information having different resolutions for each access point 330 having different performance.

FIG. 11 illustrates an example of the server-side library 730 in this case. As illustrated in FIG. 11, information is held for each access point 330 installed in each room 510. Specifically, the server-side library 730 includes the access point ID of each access point 330, the spatial configuration information 733, the information indicating the resolution of the spatial configuration information 733 (hereinafter, simply referred to as resolution) 734, the AR image information 735, and a resolution 736 of the AR image information 735. In the following, an example in which the quality (resolution) of the AR image information to be provided is changed in accordance with the performance of each access point 330 will be described, however, the quality of the AR image information may be one type.

The spatial configuration information management unit 721 of the server 700 transmits the spatial configuration information stored in the server-side library 730 in accordance with the relayed access point 330.

Thus, if requesting the spatial configuration information through the access point 330 with higher performance, the HMD 110 can acquire the spatial configuration information with higher resolution and higher quality.

Note that which of the access points 330 to be used to request the server 700 to transmit the spatial configuration information may be selected by the wearer of the HMD 110, or may be determined in advance in the HMD 110.

In the case where it is to be selected by the wearer and if a listing of the access points 330 is detected, the HMD 110 displays the list on the display 173 and accepts the selection by the wearer.

In the case where it is determined in advance, a selection rule is set in advance and registered in the ROM 142, the flash memory 143, or the like. The selection rule may be, for example, selecting the one with the highest performance among from the charge-free access points 330, selecting the one with the highest performance regardless of whether it is charge-free or with charge, or the like. In accordance with the selection rule, the authentication unit 212 selects the access point 330 to be used as a relay apparatus.

According to the present embodiment, as in the first embodiment, the server 700 uses the access point ID of the access point 330 installed in each room 510 to recognize an area where the HMD 110 is present. Therefore, the same advantageous effects as those of the first embodiment can be obtained.

Furthermore, according to the present embodiment, in the case where the access points 330 having different performance are installed in one room 510, the server 700 manages them separately. Then, the server 700 provides the display-related information in accordance with the performance of the access point 330 with the connection authentication with the HMD 110 has been established.

As described above, according to the present embodiment, the server 700 can easily identify an area where the HMD 110 is present with enough accuracy, and also can grasp the data quality desired by the HMD 110. This enables the server 700 to appropriately provide the HMD 110 with various types of display-related information required for AR display, which were created in the past, only by managing the display-related information for each presence area and for each quality. Furthermore, the HMD 110 can appropriately receive the display-related information managed by the server 700.

Third Embodiment

Next, a third embodiment of the present invention will be described. In the present embodiment, the spatial configuration information held by the server 700 includes information on the resolution thereof. Then, in accordance with the performance of the HMD 110, the spatial configuration information of the server 700 is overwritten.

Hereinafter, the present embodiment will be described while focusing on the points different from the first embodiment.

The HMD 110 according to the present embodiment has basically the same configuration as that of the first embodiment, while the difference is found in that, when acquiring the spatial configuration information, the spatial configuration information acquisition unit 214 according to the present embodiment also identifies the resolution thereof.

As illustrated in FIG. 12(*a*), in the HMD-side library 221 of the present embodiment, a resolution 221*e* of the spatial configuration information 221*b* is registered in association with the access point ID 221*a*.

The data management unit 213 of the present embodiment is basically configured to perform the same processing as that of the first embodiment. Furthermore, the data management unit 213 of the present embodiment grasps in advance the best resolution of the spatial configuration information that can be acquired by the spatial configuration information acquisition unit 214. The performance of the HMD 110 is determined, for example, based on the spatial resolution of the sensors. Then, the data management unit 213 compares the grasped resolution with the resolution of the spatial configuration information on the own room held in the server-side library, and determines from which of the devices, i.e., the server 700 or the own device, the spatial configuration information is to be acquired.

That is, when acquiring the spatial configuration information from the server 700, the data management unit 213 of the present embodiment compares the resolution of the acquired spatial configuration information with the resolution (best resolution) of the spatial configuration information that can be generated by the own device. If the best resolution is higher than that of the acquired spatial configuration information, the data management unit 213 causes the spatial configuration information acquisition unit 214 to generate the spatial configuration information by the own device. Then, the data management unit 213 transmits the generated spatial configuration information to the server 700 together with the information indicating the resolution.

The server 700 of the present embodiment is also basically configured in the same manner as that of the first embodiment, while the difference therebetween is found in that the server-side library 730 of the present embodiment includes the information on the resolution of spatial configuration information.

FIG. 12(*b*) illustrates an example of the server-side library 730 of the present embodiment. As illustrated in FIG. 12(*b*), the server-side library 730 includes the resolution 734 of the spatial configuration information and the resolution 736 of the AR image information in addition to the information held by the server-side library 730 of the first embodiment.

The information on the best resolution of the spatial configuration information that can be acquired by the spatial configuration information acquisition unit 214 of the own device is stored in advance.

Upon receiving the spatial configuration information, the spatial configuration information management unit 721 of the server 700 determines whether to register the received spatial configuration information in the server-side library 730 in association with the access point ID of the access point 310 through which the transmission source has passed.

In the present embodiment, the spatial configuration information management unit 721 registers the received spatial configuration information in the case where it has not been registered. On the other hand, in the case where the spatial configuration information has already registered in association with the access point ID, the spatial configuration information management unit 721 compares the resolution of the registered spatial configuration information with the resolution of the received spatial configuration information. If the resolution of the received spatial configuration information is higher, the spatial configuration information management unit 721 replaces the existing spatial configuration information with the received spatial configuration information. The information on the existing resolution is also replaced with the information on the resolution of the received spatial configuration information.

Thus, the server-side library 730 of the present embodiment retains the spatial configuration information having the best resolution at that time.

Figure 13:
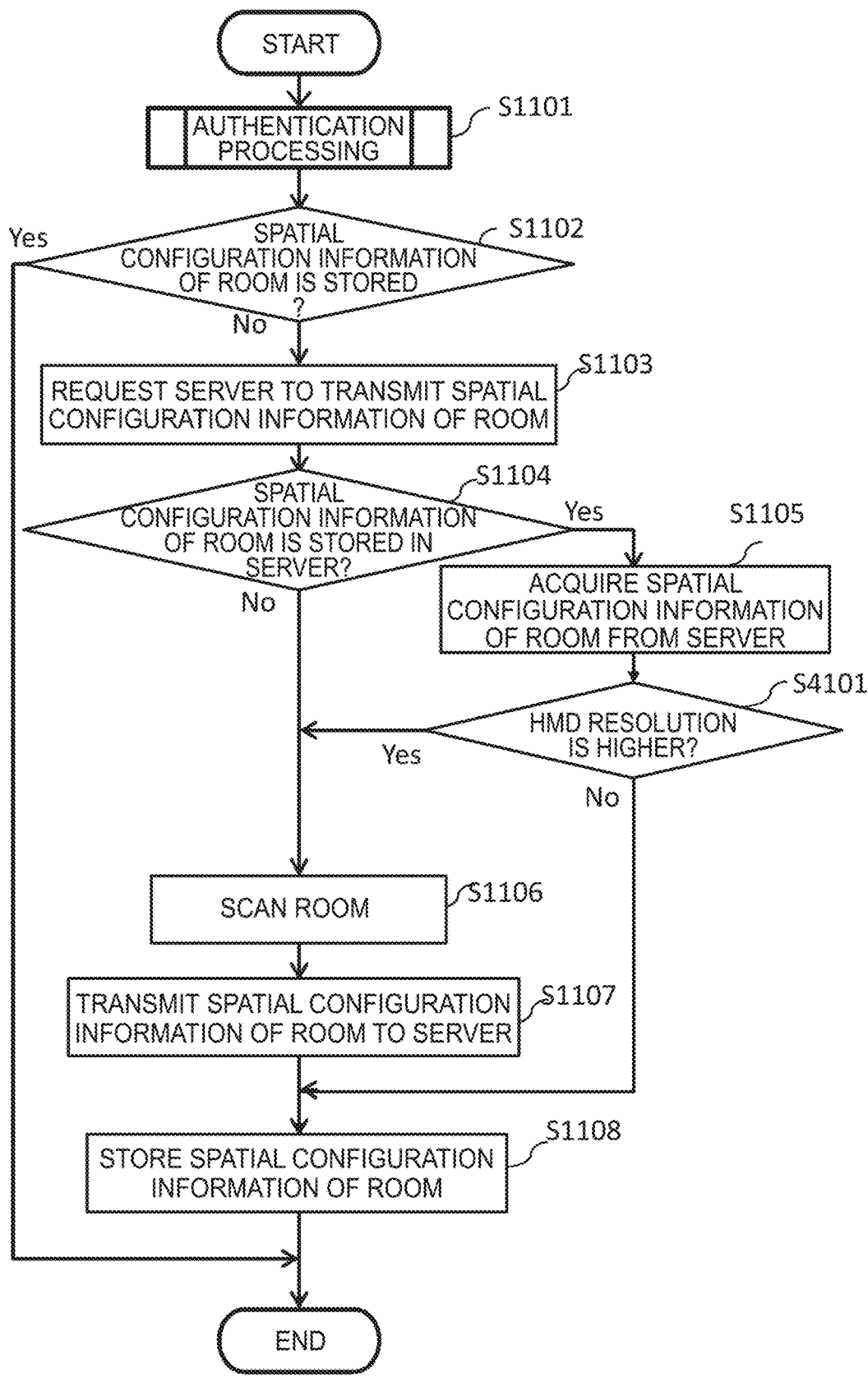
FIG. 13 is a flowchart of spatial configuration information acquisition processing according to the third embodiment.

Hereinafter, a processing flow of the spatial configuration information acquisition processing according to the present embodiment will be described. FIG. 13 illustrates a processing flow of the spatial configuration information acquisition processing by the HMD 110 according to the present embodiment. This processing is started at the same timing as that of the first embodiment. After the processing is started, firstly, the authentication unit 212 performs the authentication processing (step S1101). This processing is the same as that of the first embodiment.

As in the first embodiment, the data management unit 213 determines whether the spatial configuration information on the room 510 is held in the HMD 110 (step S1102).

If it is held (step S1102; Yes), the data management unit 213 ends the processing as it is.

On the other hand, if it is not held (step S1102; No), the data management unit 213 requests the server 700 to transmit the spatial configuration information through the access point 310 (step S1103). Then, the data management unit 213 distinguishes the content of the reply provided in response to the request (step S1104).

If the reply indicates the spatial configuration information is available (step S1104; Yes), the data management unit 213 downloads the spatial configuration information to be provided from the server 700 (step S1105).

Then, the data management unit 213 of the present embodiment compares the resolution of the downloaded spatial configuration information with the best resolution of the spatial configuration information that can be acquired by the spatial configuration information acquisition unit 214 of the own device (step S4101). If the resolution of the spatial configuration information of the own device is equal to or less than the resolution of the spatial configuration information held by the server 700 (step S4101; No), as in the first embodiment, the data management unit 213 registers the received spatial configuration information in the HMD-side library 221 (step S1108), and ends the processing. At this time, the data management unit 213 registers the spatial configuration information in association with the access point ID of the access point 310 which was acquired by the authentication unit 212.

On the other hand, when the reply does not include the spatial configuration information (step S1104; No) and the best resolution of the spatial configuration information of the own device is higher than that of the spatial configuration information held by the server 700 (step 4101; Yes), the data management unit 213 instructs the spatial configuration information acquisition unit 214 to acquire the spatial configuration information.

In response to the instruction, the spatial configuration information acquisition unit 214 scans the room 510 (step S1106) to acquire the spatial configuration information. Then, the spatial configuration information acquisition unit 214 transmits the acquired spatial configuration information to the server 700 (step S1107), and also registers it in the HMD-side library 221 in association with the access point ID of the access point 310 acquired by the authentication unit 212 (step S1108). At this time, the acquired spatial configuration information is transmitted to the server 700 through the access point 310. Then, the spatial configuration information acquisition unit 214 ends the processing.

Figure 14:
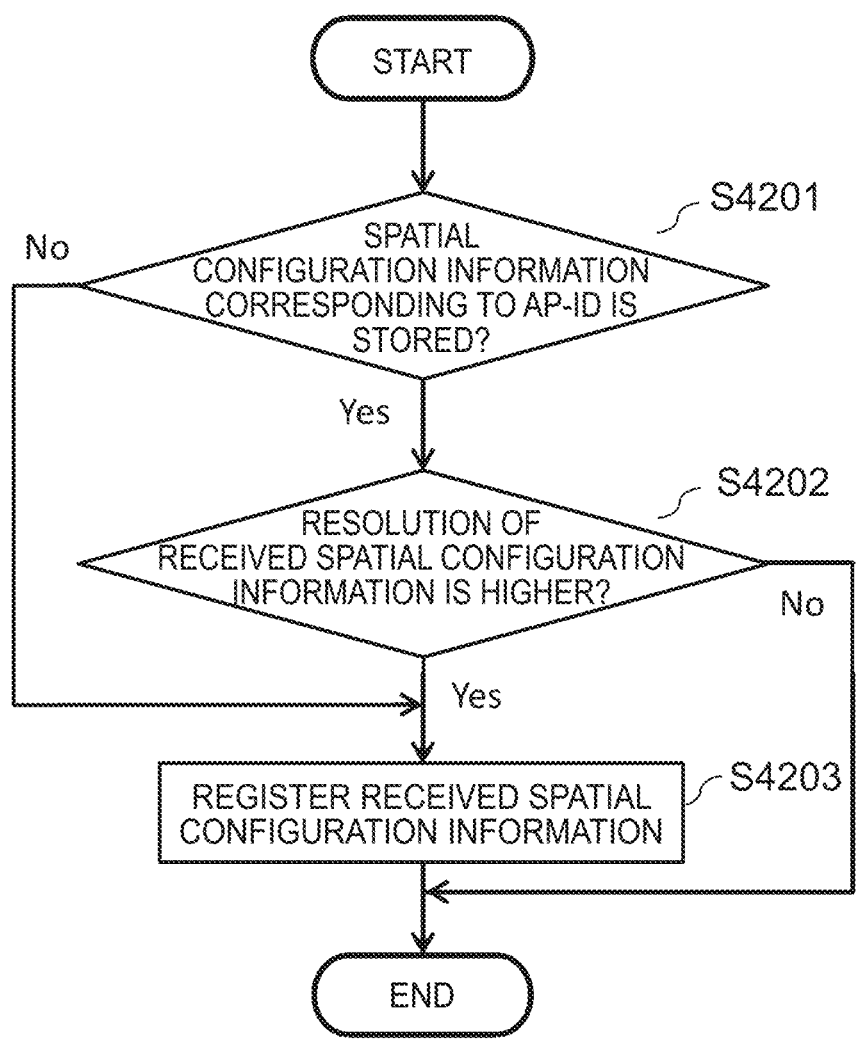
FIG. 14 is a flowchart of spatial configuration information management processing according to the third embodiment.

Next, the spatial configuration information management processing on the server side according to the present embodiment will be described. FIG. 14 illustrates a processing flow of the spatial configuration information management processing by the spatial configuration information management unit 721 of the server 700 according to the present embodiment. The spatial configuration information management unit 721 starts the processing upon receiving the spatial configuration information from the HMD 110.

The spatial configuration information management unit 721 determines whether the spatial configuration information on the room 510, which was identified based on the received spatial configuration information, has already been registered in the server-side library 730 (step S4201). Specifically, the spatial configuration information management unit 721 determines whether the spatial configuration information has already been registered in association with the access point ID of the relayed access point 310.

If it is not registered (step S4201; No), the spatial configuration information management unit 721 registers the received spatial configuration information in association with the access point ID of the relayed access point 310 (step S4203). At this time, the information on the resolution is also registered.

On the other hand, if the spatial configuration information has already been registered (step S4201; Yes), the spatial configuration information management unit 721 compares the resolution of the corresponding spatial configuration information in the library with the resolution of the received spatial configuration information (step S4202).

If the resolution of the received spatial configuration information is higher than the resolution of the spatial configuration information in the library (step S4202; Yes), the spatial configuration information management unit 721 replaces the spatial configuration information in the library with the received spatial configuration information (step S4203), and ends the processing. At this time, the information on the resolution is also replaced with the information on the resolution of the received spatial configuration information.

Otherwise (step S4202; No), the spatial configuration information management unit 721 discards the received spatial configuration and ends the processing.

As described above, in the present embodiment, the display-related information (spatial configuration information) is held together with the information on the resolution thereof in the server-side library 730. Then, in the case where the HMD 110 can acquire the information having higher resolution, the held information is replaced with the display-related information (space configuration information) acquired by the HMD 110.

Thus, according to the present embodiment, the server 700 retains the display-related information (spatial configuration information) having high resolution provided by the HMD 110 having the highest performance among the HMDs 110 that may be used. This allows the HMD 110 to use the spatial configuration information with high resolution.

Therefore, according to the present embodiment, the HMD 110 can use the spatial configuration information with high resolution regardless of the spatial resolution of the sensors of the own device.

<Fourth Modification>

In the above embodiment, in the case where the resolution of the received spatial configuration information is high, the server 700 replaces the registered spatial configuration information therewith. However, the present invention is not limited thereto. For example, the server may hold a plurality of pieces of spatial configuration information having different resolutions.

In such a case, when receiving the spatial configuration information, the HMD 110 can designate the resolution thereof.

Fourth Embodiment

Next, a fourth embodiment of the present invention will be described. In the embodiments and modifications described above, the HMD 110 is always connected to a relay apparatus installed in each room 510, and the server 700 uses the identification information on the relay apparatus to determine an area where the HMD 110 is present. However, in practical communication environments, the HMD 110 is not always connected to a relay apparatus installed in the room 510 where the wearer is present.

In the present embodiment, a method which enables identification of an area where the HMD is present even in such environments is provided. In the present embodiment, the server-side library 730 in which the room 510, the access point ID of the access point installed in the room 510, and the spatial configuration information on the room 510 are associated with each other is created in advance and held by the server 700.

Hereinafter, the present embodiment will be described while focusing on the points different from the first embodiment.

Figure 15:
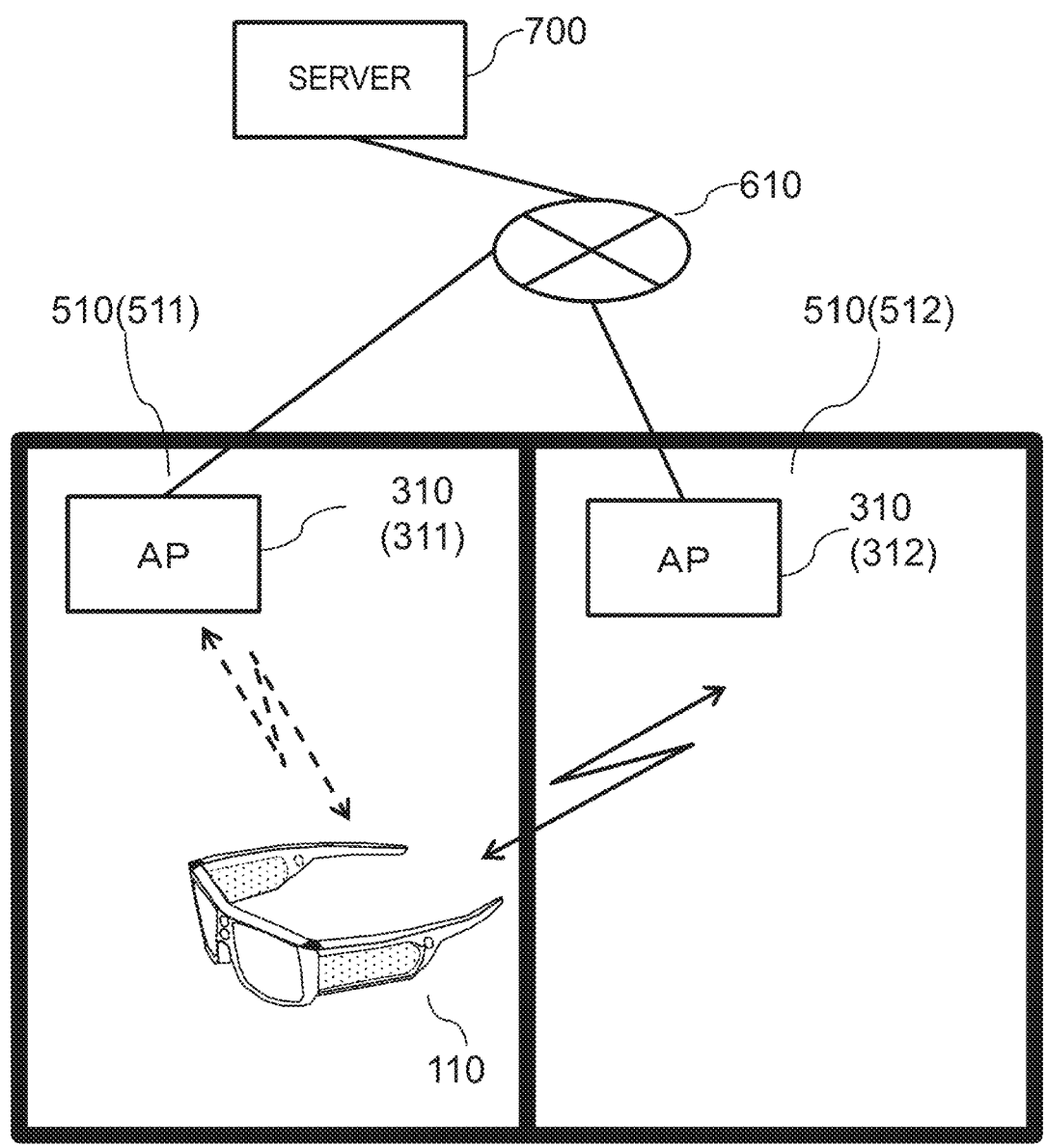
FIG. 15 illustrates an outline of a presence area identification system according to the fourth embodiment.

FIG. 15 illustrates an outline of the present embodiment.

Generally, the electric field intensity of the wireless LAN generated from the first access point 311 in the first room 511 where the HMD 110 is present is more than the electric field intensity of the wireless LAN generated from the second access point 312 in the other second room 512. Thus, the first access point 311 in the first room 511 is automatically selected as an access point to which the HMD 110 is to be connected.

However, the HMD 110 is not always connected to the AP 310 of the room 510 where the HMD 110 is present. For example, depending on the relation between the installation position of the access point 310 and the location of the HMD 110, even when the wearer of the HMD 110 is in the first room 511, the HMD 110 may be connected to the AP 312 installed in the adjacent second room 512. In the present embodiment, even in such a case, the server 700 can appropriately identify the room 510 where the HMD 110 is present.

The hardware configuration of the HMD 110 according to the present embodiment is the same as that of the first embodiment. On the other hand, the functional aspect of the HMD 110 according to the present embodiment is different from that of the first embodiment.

Figures 16A, 16B:
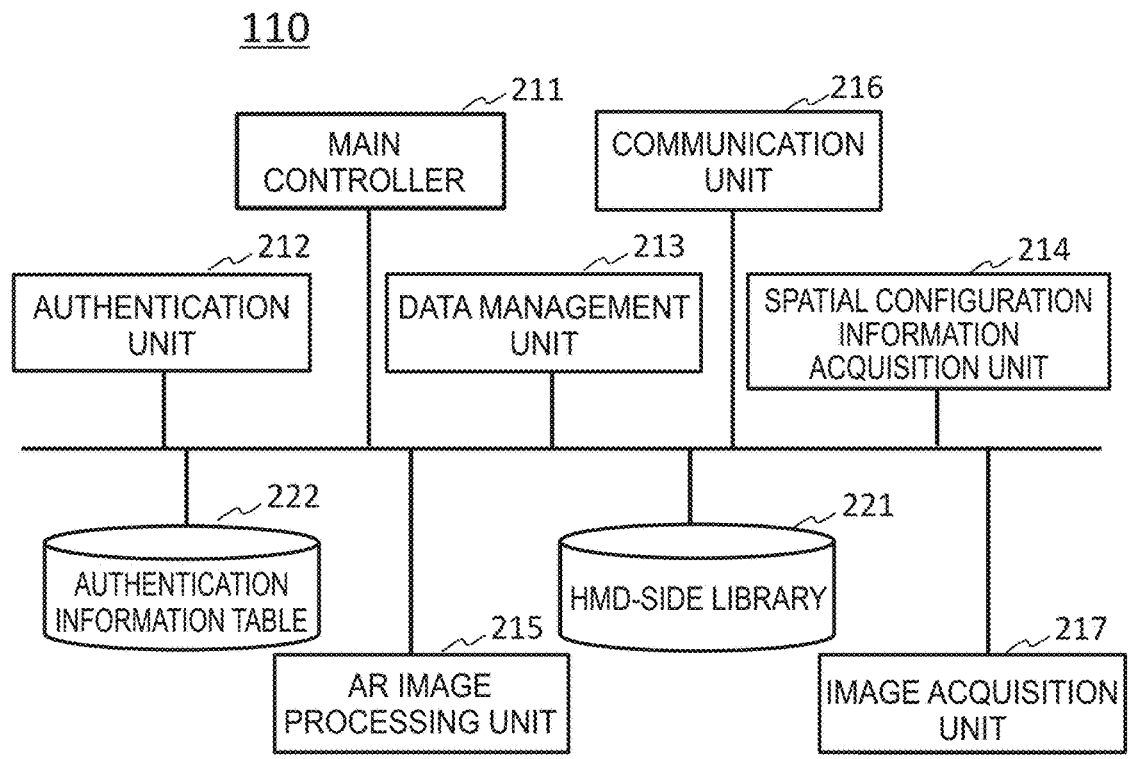
FIG. 16(*a*) is a functional block diagram of the fourth embodiment, and FIG. 16(*b*) illustrates a server-side library according to the fourth embodiment.

FIG. 16(a) is a functional block diagram of the HMD 110 according to the present embodiment. The HMD 110 further includes an image acquisition unit 217 in addition to the units of the first embodiment. The image acquisition unit 217 is configured to acquire (capture) an image as visual information using the camera 170 in accordance with an instruction from the wearer. The image to be acquired may be a still image or a moving image.

The spatial configuration information acquisition unit 214 of the present embodiment requests the server 700 to transmit the spatial configuration information when no spatial configuration information on the own room is available in the HMD-side library 221. At this time, in the present embodiment, the spatial configuration information acquisition unit 214 further transmits an image in which the own room is captured as the visual field information.

Next, the server 700 will be described. The server 700 according to the present embodiment basically has the same configuration as the first embodiment, while the difference therebetween is found in the processing by the spatial configuration information management unit 721 and the data held by the server-side library 730.

Firstly, as illustrated in FIG. 16(b), the server-side library 730 of the present embodiment further retains the location information on each room 510 or each access point 310. Here, for example, an example in which the information on a predetermined position (for example, the southwest corner) of the room 510 is held will be described. The location information may be, for example, latitude and longitude information or information based on a coordinate system defined in the system. In the case of a polygonal shaped room, latitude and longitude information on each corner of the room may be held.

The spatial configuration information management unit 721 receives the image as the visual field information together with the spatial configuration information request. Then, the spatial configuration information management unit 721 determines whether the spatial configuration information on the room 510, which could be identified based on the simultaneously received access point ID, includes an area that matches the visual field information. If the spatial configuration information on the room 510 does not include such an area, the spatial configuration information management unit 721 sequentially determines, in order of proximity to the room 510, whether each spatial configuration information on each of the other rooms 510 includes the area that matches the visual field information. Then, the spatial configuration information management unit 721 transmits the spatial configuration information on the room including the area that matches the visual field information to the transmission source. In the case where no spatial configuration information on each room 510 in a predetermined range includes the area that matches the visual field information, the spatial configuration information management unit 721 replies that any spatial configuration information that matches the visual field information is not registered.

The spatial configuration information management unit 721 registers, in the server-side library 730, the spatial configuration information, which was transmitted from the HMD 110 in response to the reply, in association with the access point ID of the relayed access point 310.

Figure 17:
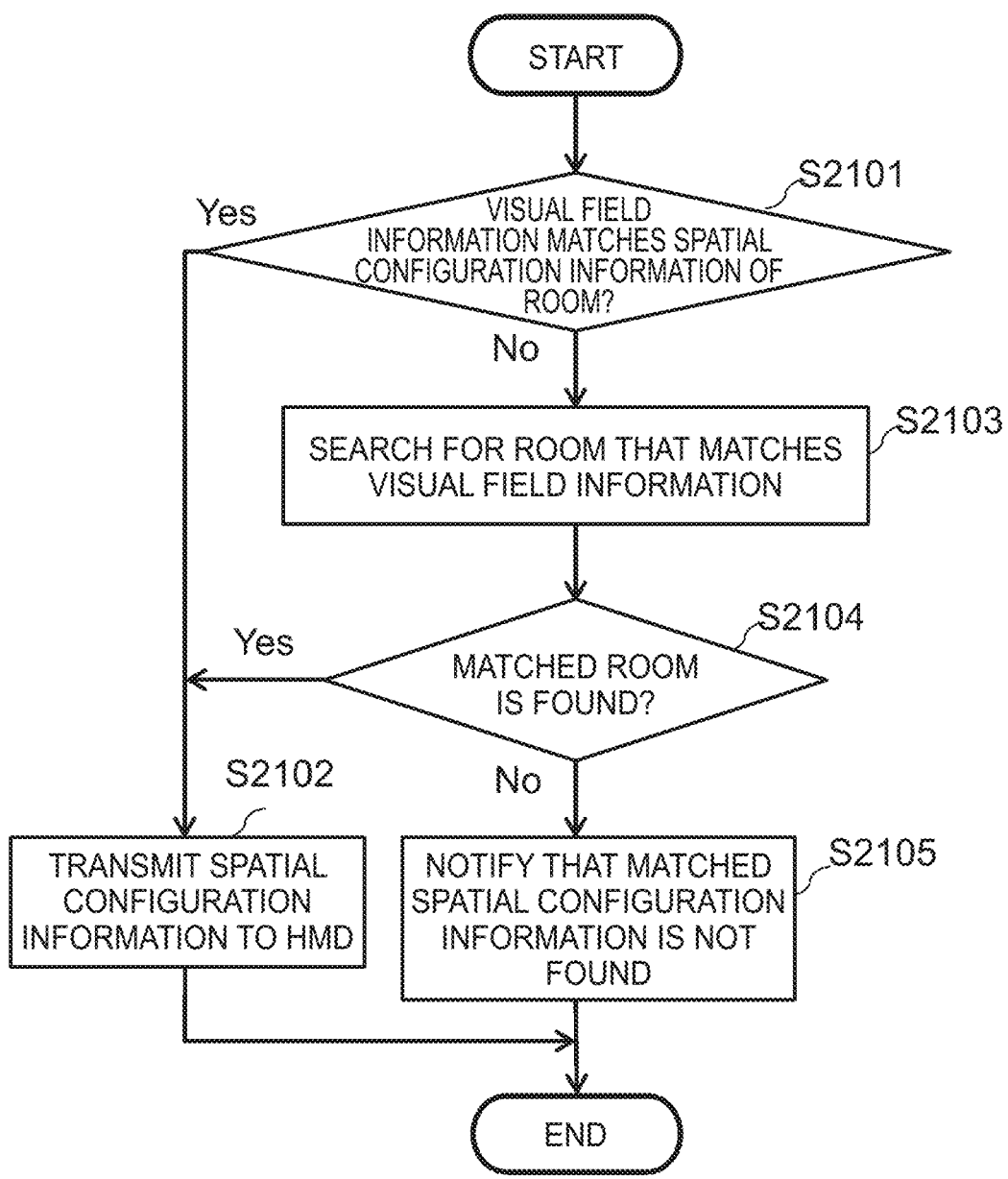
FIG. 17 is a flowchart of spatial configuration information management processing according to the fourth embodiment.

The flow of the spatial configuration information acquisition processing and spatial configuration information management processing according to the present embodiment will be described. The spatial configuration information acquisition processing and authentication processing on the HMD 110 side is the same as that of the first embodiment. Here, the spatial configuration information management processing by the server 700 will be described. FIG. 17 is a flowchart of the processing flow on the server 700 side according to the present embodiment. The server 700 starts the processing upon receiving the visual field information together with the request to transmit the spatial configuration information from the HMD 110.

The spatial configuration information management unit 721 determines whether the spatial configuration information 733 (spatial configuration information on the room) stored in the server-side library 730 in association with the access point ID of the transmission source includes an area that matches the visual field information (step S2101).

If the spatial configuration information 733 includes such an area (step S2101; Yes), the spatial configuration information management unit 721 transmits the spatial configuration information to the transmission source (step S2102), and ends the processing.

If the spatial configuration information 733 does not include the area that matches the visual field information (step S2101; No), the spatial configuration information management unit 721 searches for the room 510 including the area that matches the visual field information (step S2103). Here, firstly, the spatial configuration information management unit 721 uses the location information on the room 510 with which the access point ID of the transmission source is associated and the location information on another room 510 to calculate the distance therebetween, and performs the same determination processing as that in step S2101 as described above with respect to each room 510 in order from the nearest one. Note that an upper limit M (M is an integer of 1 or more) of the number of rooms to be determined is set in advance.

Based on the search result obtained in step S2103, the spatial configuration information management unit 721 determines whether the spatial configuration information including the area that matches the visual field information is found (step S2104). If it is found (step S2104; Yes), the spatial configuration information management unit 721 transmits the spatial configuration information to the HMD 110 which is the transmission source (step S2102), and ends the processing. If it is not found (step S2104; No), the spatial configuration information management unit 721 transmits a reply to that effect (step S2105), and ends the processing.

In the present embodiment, when receiving the reply from the server 700 that the space configuration information on the room 510 is not stored on the server side, as in the first embodiment, the HMD 110 executes mapping of the room 510 by the own device to generate the space configuration information. Then, the generated spatial configuration information is transmitted to the server 700 and registered therein. At this time, in the present embodiment, the access point 310 installed in the room 510 is intentionally selected and transmitted.

Upon receiving the spatial configuration information from the HMD 110, the spatial configuration information management unit 721 registers the spatial configuration information in the server-side library 730 in association with the access point ID of the access point of the transmission source.

According to the present embodiment, not only an access point ID of an access point but also an image acquired by the HMD 110 are used to identify an area where the HMD 110 is present.

According to the present embodiment, even in the case where the HMD 110 may be connected to the access point 310 which is installed outside of the room 510 where the wearer of the HMD 110 is present, it can appropriately acquire and use the spatial configuration information stored in the server 700. Furthermore, at this time, no special authentication processing is required.

In the case where the spatial configuration information is stored in the HMD 110, the stored spatial configuration information is transmitted to the server 700, whereby the server can compare the spatial configuration information with each other to confirm whether it matches the room.

<Fifth Modification>

As described above, a Global Positioning System (GPS) is not used in the embodiments and modifications described above. However, GPS information acquired by the GPS receiver 151 of the HMD 110 may be used.

For example, in the case of a room in a one-story building, using the GPS information enables identification of the room 510 where the HMD 110 is present. For example, in the case where the room has a rectangular shape, the latitudes and longitudes at the four corners of the room are registered in the server-side library 730 of the server 700 as location information on each room.

By comparing the GPS information (latitude and longitude) transmitted from the HMD 110 with the location information on each room registered in the server 700, the room where the HMD 110 is present is identified.

<Sixth Modification>

The registration date and time of the spatial configuration information may be registered in the server-side library 730. Whether the spatial configuration information has been registered may be determined based on not only the presence or absence thereof, but also the registration date and time. That is, even if the spatial configuration information is registered, in the case where the difference between the registration date and time and the current date and time is equal to or more than a predetermined value, the spatial configuration information is determined to be unregistered.

For example, since a condition within the room 510 may change, managing the spatial configuration information based on the date and time improves responsibility to the change in the arrangement of the interior or the like.

<Seventh Modification>

In each of the embodiments described above, as the identification information on each room, basically, a relay apparatus which is installed in each room 510 to relay the HMD 110 to a communication network is used. However, the identification information is not limited thereto. For example, in the case where each room is provided with a unique device capable of transmitting information identifying the room, such a device may be used. The device capable of transmitting information identifying the room is, for example, a room access management device having a communication function.

Furthermore, in the embodiments described above, as a mobile information device, the HMD 110 is used. However, a mobile information device is not limited thereto. For example, it may be a notebook PC, a tablet PC, or any other portable information device having similar functions.

The present invention is not limited to the embodiments and modifications described above, and various modifications are possible. For example, a part of an exemplary embodiment may be replaced with a part of other embodiments, and a part of other embodiments may be added to the exemplary embodiment. These modifications belong to the scope of the present invention. Furthermore, the numerical values, messages, and the like appearing in the description and drawings are merely examples, and the effect of the present invention is not impaired even if different ones are used.

A part of or all of the functions and the like of the present invention described above may be implemented by hardware, for example, by designing it by an integrated circuit. Alternatively, a microprocessor unit or the like may interpret and execute a program for implementing each function or the like, thereby implementing it by software. Hardware and software may be used together. The software may be stored in advance in the ROM 142 and the like of the HMD 110 at the time of product shipment. The software may be acquired from various servers or the like on the Internet after the product is shipped. Furthermore, the software which is provided in a memory card, an optical disk, or the like may be acquired.

Furthermore, the control lines and information lines which are considered to be necessary for the purpose of explanation are indicated herein, but not all the control lines and information lines of actual products are necessarily indicated. It may be considered that almost all the configurations are actually connected to each other.

REFERENCE SIGNS LIST

100: presence area identification system, 100a: presence area identification system, 111: first HMD, 112: second HMD, 113: system bus, 120: main processor, 141: RAM, 142: ROM, 143: flash memory, 151: GPS receiver, 152: geomagnetic sensor, 153: range sensor, 154: acceleration sensor, 155: gyro sensor, 156: timer, 161: wireless communication IF, 162: telephone network communication IF, 170: camera, 171: in-camera, 172: out-camera, 173: display, 181: microphone, 182: speaker, 183: audio decoder, 191: button switch, 192: touch screen,

211: main controller, 212: authentication unit, 213: data management unit, 214: spatial configuration information acquisition unit; 215: AR image processing unit, 216: communication unit, 217: image acquisition unit, 221: HMD-side library, 221a: access point ID, 221b: spatial configuration information, 221c: AR image information, 221d: BS-ID, 221e: resolution, 222: authentication information table,

310 access point, 311: first access point, 312: second access point, 321: first BS, 322: second BS, 330: access point, 331: access point, 332: access point, 340; HUB, 510: room, 511: first room, 512: second room, 520: table, 610: network, 620: mobile phone network, 621: mobile phone network, 622: mobile phone network, 630: network, 631: mobile management, 632: home subscriber server, 700: server, 720: main processor, 721: spatial configuration information management unit, 730: server-side library, 731: room number, 732: access point ID, 733: spatial configuration information, 734: resolution, 735: AR image information, 736: resolution, 741: RAM, 742: ROM, 743: flash memory, 761: communication I/F, 773: display, 791: operation device, T421: time axis, T422: time axis, T423: time axis, T424: time axis, T451: time axis, T452: time axis, T453: time axis.

The invention claimed is:

1. A portable information device, comprising:
a display;
a communication interface provided for connection to a network;
a storage device;
at least one of a camera and a range sensor; and
a processor configured to:
  acquire, from a relay apparatus that is installed in a space where the portable information device is present and that connects the portable information device to the network, relay apparatus identification information which is information identifying the relay apparatus;
  determine whether spatial configuration information obtained by mapping the space, which is necessary for displaying on the display, is registered in the storage device;
  in a case that the spatial configuration information is not registered, send a request to transmit the spatial configuration information, from the communication interface to a server connected to the network through the relay apparatus;
  in a case that the spatial configuration information is received from the server in response to the request, store the spatial configuration information in the storage device in association with the relay apparatus identification information; and
  in a case that the spatial configuration information is not received from the server in response to the request:
    use the at least one of the camera and the range sensor to generate the spatial configuration information on the space; and
    store the spatial configuration information that has been generated in the storage device in association with the relay apparatus identification information.

2. The portable information device according to claim 1, wherein the relay apparatus is an access point of a wireless LAN.

3. The portable information device according to claim 2, wherein millimeter waves are used for communication between the communication interface and the relay apparatus.

4. The portable information device according to claim 1, wherein the relay apparatus is a base station of mobile phones.

5. The portable information device according to claim 1, wherein the relay apparatus is a relay apparatus for a wired LAN.

6. The portable information device according to claim 1, wherein the storage device retains a best resolution of the spatial configuration information that can be generated by the portable information device, and the processor is further configured to, in the case that the spatial configuration information is received from the server:
  compare a resolution of the spatial configuration information that has been received with the best resolution; and
  in a case that the best resolution is higher than the resolution of the spatial configuration information received from the server:
    use the at least one of the camera and the range sensor to generate new spatial configuration information on the space at the best resolution;
    store the new spatial configuration information in the storage device in association with the relay apparatus identification information; and
    transmit the new spatial configuration information together with information indicating the best resolution to the server through the relay apparatus.

7. The information processing system according to claim 1, wherein the processor is further configured to transmit the generated spatial configuration information in association with a resolution of the spatial configuration information to the server.

8. An information processing system, comprising:
a plurality of relay apparatuses, each relay apparatus installed in a corresponding space of a plurality of spaces delimited by a structure, respectively;
a server connected to a network through the relay apparatus, the server including a server storage device and a server processor; and
a portable information device including:
  a display;
  a communication interface provided for connection to the network;
  a storage device;
  at least one of a camera and a range sensor; and
  a processor configured to:
    acquire, from a relay apparatus of the plurality of relay apparatuses that is installed in a space of the plurality of spaces where the portable information device is present and that connects the portable information device to the network, relay apparatus identification information which is information identifying the relay apparatus;
    determine whether spatial configuration information obtained by mapping the space, which is necessary for displaying on the display, is registered in the storage device;
    in a case that the spatial configuration information is not registered, send a request to transmit the spatial configuration information, from the communication interface to the server;
    in a case that the spatial configuration information is received from the server in response to the request, store the spatial configuration information in the storage device in association with the relay apparatus identification information; and
    in a case that the spatial configuration information is not received from the server in response to the request;
      use the at least one of the camera and the range sensor to generate the spatial configuration information on the space; and store the spatial configuration information that has been generated in the storage device in association with the relay apparatus identification information, wherein in the server storage device, the spatial configuration information on each space of the plurality of spaces in which the at least one relay apparatus of the plurality of relay apparatuses is installed is registered in association with the at least one relay apparatus of the plurality of relay apparatuses, and the server processor is configured to, upon receiving the request from the portable information device through the at least one relay apparatus, transmit, to the portable information device, the spatial configuration information registered in the server storage device in association with the at least one relay apparatus through which the request has passed.

9. The information processing system according to claim 8, wherein the space is provided with, as the relay apparatuses, a first relay apparatus and a second relay apparatus which differ from each other in performance, and in the server storage device, the spatial configuration information having resolution corresponding to the performance of each of the relay apparatuses is registered in association with each of the relay apparatuses.

10. The information processing system according to claim 8, wherein the processor is configured to transmit the spatial configuration information in association with resolution thereof to the server, in the server storage device, the resolution of the spatial configuration information is registered in association with the spatial configuration information, and the server processor is further configured to, in a case that the spatial configuration information and the resolution are received from the portable information device through the at least one relay apparatus:

compare the resolution that has been received with the resolution of the spatial configuration information associated with the at least relay apparatus and stored in the server storage device; and in a case that the resolution that has been received is higher, update the spatial configuration information stored in the server storage device to the spatial configuration information that has been received.

11. The information processing system according to claim 8, wherein the server includes a library in which an area where each relay apparatus of the plurality of relay apparatuses is present is registered, for each relay apparatus, is in association with relay apparatus identification information identifying each relay apparatus, the portable information device is configured to obtain connection authentication from a corresponding relay apparatus of the plurality of relay apparatuses which is installed in an area where an own device is present, and when the connection authentication is successful, the corresponding relay apparatus that has provided the connection authentication is configured to transmit the relay apparatus identification information to the server.

* * * * *